United States Patent
Abedini

(10) Patent No.: US 12,543,065 B2
(45) Date of Patent: Feb. 3, 2026

(54) TECHNIQUES FOR NEIGHBOR CELL MEASUREMENT IN WIRELESS COMMUNICATIONS SYSTEMS

(71) Applicant: QUALCOMM Incorporated, San Diego, CA (US)

(72) Inventor: Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/459,168

(22) Filed: Aug. 31, 2023

(65) Prior Publication Data

US 2025/0081016 A1    Mar. 6, 2025

(51) Int. Cl.
| | |
|---|---|
| H04W 8/22 | (2009.01) |
| H04W 24/10 | (2009.01) |
| H04W 36/00 | (2009.01) |
| H04W 48/14 | (2009.01) |
| H04W 52/02 | (2009.01) |
| H04W 72/231 | (2023.01) |
| H04W 84/02 | (2009.01) |
| H04W 88/02 | (2009.01) |
| H04W 88/08 | (2009.01) |
| H04W 92/02 | (2009.01) |
| H04W 92/10 | (2009.01) |

(52) U.S. Cl.
CPC ............. *H04W 24/10* (2013.01); *H04W 8/22* (2013.01); *H04W 36/0061* (2013.01); *H04W 48/14* (2013.01); *H04W 52/0206* (2013.01); *H04W 72/231* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .......... H04B 17/0082–3913; H04W 8/22–245; H04W 24/02–10; H04W 36/0005–385; H04W 48/02–20; H04W 52/02–60; H04W 72/02–569; H04W 84/02–16; H04W 88/02–12; H04W 92/02–04; H04W 92/10; Y02D 30/70
See application file for complete search history.

(56) References Cited

U.S. PATENT DOCUMENTS

2019/0342824 A1* 11/2019 Futaki ............... H04W 36/0077
2025/0193764 A1*  6/2025 Jung .................... H04W 36/362

* cited by examiner

*Primary Examiner* — Timothy J Weidner
(74) *Attorney, Agent, or Firm* — Dalei Dong; Holland & Hart LLP

(57) ABSTRACT

Methods, systems, and devices for wireless communications are described for a user equipment (UE) to report information associated with neighbor cells when one or more of the neighbor cells are operating in an energy saving mode. A serving cell of a network entity, such as a primary cell (PCell) may request a neighbor cell report from a served UE and, if a neighboring cell is in a NES mode, the served UE may provide an indication that the neighbor cell is in the NES mode. The UE 115 in some cases may transmit a demand for an on-demand signal from the neighbor cell, and monitor for the subsequent signal. The UE may transmit the neighbor cell report to the serving cell based on information provided from one or more of the transmissions of the neighbor cell.

30 Claims, 19 Drawing Sheets

TECHNIQUES FOR NEIGHBOR CELL MEASUREMENT IN WIRELESS COMMUNICATIONS SYSTEMS

FIELD OF TECHNOLOGY

The following relates to wireless communications, including techniques for neighbor cell measurement in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for neighbor cell measurement in wireless communications systems. For example, the described techniques provide for user equipment (UE) reporting of information associated with neighbor cells when one or more of the neighbor cells are operating in an energy saving mode. In some aspects, a serving cell may request a neighbor cell report from a served UE and, if a neighboring cell is in a network energy saving (NES) mode, the served UE may provide an indication that the neighbor cell is in the NES mode (e.g., provide an indication that a synchronization signal block (SSB) or remaining minimum system information (RMSI) of the neighbor cell is provided only on-demand). In some aspects, the UE may transmit a demand for the on-demand signal from the neighbor cell (e.g., a wake-up signal (WUS) to trigger a SSB or RMSI transmission). In some cases, the serving cell may provide one or more conditions to the UE (e.g., a received power threshold, or specific cell IDs) and, if the condition(s) are met, the UE may autonomously transmit the demand for the on-demand signal. In some aspects, the UE may indicate to the serving cell that the neighbor cell has on-demand SSB, and the serving cell may indicate to the UE that a WUS is to be transmitted.

The neighbor cell report, in some aspects, may be a cell global identity (CGI) report, a system frame number and frame timing difference (SFTD) report, a measurement report, or any combinations thereof. In some aspects, when transmitting a CGI report, the UE may transmit a cell identification for the neighbor cell, along with an indication that the cell is in an NES mode. Additionally, or alternatively, when transmitting a SFTD report the UE may transmit cell timing for the neighbor cell along with an indication that the cell is in an NES mode. Additionally, or alternatively, the UE may provide a measurement report for the neighbor cells that indicates signal measurements of the neighbor cell (e.g., reference signal received power (RSRP), received signal strength indicator (RSSI), reference signal received quality (RSRQ), signal to interference and noise ratio (SINR), etc.). The measurement report may provide beam measurements and, in cases where a beam index is not provided by the neighbor cell, an indication of timing information (e.g., SFN, slot index, symbol index, timing with respect to a measurement window, and/or closest SSB index of the serving cell).

A method for wireless communication by a user equipment (UE) is described. The method may include receiving, from a serving cell, a request for a report for one or more neighbor cells, receiving an indication from a first neighbor cell of the one or more neighbor cells that a first signal that provides information for the report from the first neighbor cell is an on-demand signal, and transmitting a notification to the serving cell that indicates the first signal of the first neighbor cell is an on-demand signal.

A UE for wireless communication is described. The UE may include one or more memories storing processor executable code, and one or more processors coupled with the one or more memories. The one or more processors may individually or collectively operable to execute the code to cause the UE to receive, from a serving cell, a request for a report for one or more neighbor cells, receive an indication from a first neighbor cell of the one or more neighbor cells that a first signal that provides information for the report from the first neighbor cell is an on-demand signal, and transmit a notification to the serving cell that indicates the first signal of the first neighbor cell is an on-demand signal.

Another UE for wireless communication is described. The UE may include means for receiving, from a serving cell, a request for a report for one or more neighbor cells, means for receiving an indication from a first neighbor cell of the one or more neighbor cells that a first signal that provides information for the report from the first neighbor cell is an on-demand signal, and means for transmitting a notification to the serving cell that indicates the first signal of the first neighbor cell is an on-demand signal.

A non-transitory computer-readable medium storing code for wireless communication is described. The code may include instructions executable by a processor to receive, from a serving cell, a request for a report for one or more neighbor cells, receive an indication from a first neighbor cell of the one or more neighbor cells that a first signal that provides information for the report from the first neighbor cell is an on-demand signal, and transmit a notification to the serving cell that indicates the first signal of the first neighbor cell is an on-demand signal.

Some examples of the method, UEs, and non-transitory computer-readable medium described herein may further include operations, features, means, or instructions for transmitting, responsive to the indication that the first signal is an on-demand signal, a transmission request to the first neighbor cell to transmit the first signal, obtaining information for the report from a transmission of the first signal from the first neighbor cell, and transmitting the information for the first neighbor cell to the serving cell in the report. Some examples of the method, UEs, and non-transitory computer-readable medium described herein may further include operations, features, means, or instructions for determining that one or more conditions associated with the first neighbor cell meet a threshold value and transmitting a transmission request to the first neighbor cell to transmit the first signal.

In some examples of the method, UEs, and non-transitory computer-readable medium described herein, the one or more conditions comprise one or more of a cell identification of the first neighbor cell that may be included in a list of cells for which the UE is to report a cell global identity (CGI), a list of cells for which the UE is to report a system frame number and frame timing difference (SFTD) measurement, or a separate list of cells provided by the serving cell, a reference signal received power (RSRP) associated with the first neighbor cell that exceeds a RSRP threshold value, a received signal strength indicator (RSSI) associated with the first neighbor cell that exceeds a RSSI threshold value, and a signal to noise ratio (SNR) associated with the first neighbor cell that exceeds a SNR threshold value.

In some examples of the method, UEs, and non-transitory computer-readable medium described herein, the receiving the request for the report may include operations, features, means, or instructions for receiving, from the serving cell, a request for a CGI report, and where the first signal is a synchronization signal block (SSB) or remaining minimum system information (RMSI) that includes a cell identification of the first neighbor cell. In some examples of the method, UEs, and non-transitory computer-readable medium described herein, the notification to the serving cell is an indication that the on-demand signal of the first neighbor cell is an on-demand system information block.

Some examples of the method, UEs, and non-transitory computer-readable medium described herein may further include operations, features, means, or instructions for receiving, from the serving cell, an indication to request the on-demand system information block of the first neighbor cell, transmitting a wake-up signal to the first neighbor cell, monitoring for the on-demand system information block of the first neighbor cell, and transmitting the report to the serving cell with information from the on-demand system information block of the first neighbor cell. Some examples of the method, UEs, and non-transitory computer-readable medium described herein may further include operations, features, means, or instructions for transmitting a capability indication that the UE is capable of transmitting a demand signal to neighboring cells for reports.

In some examples of the method, UEs, and non-transitory computer-readable medium described herein, the receiving the request for the report may include operations, features, means, or instructions for receiving, from the serving cell, a request for a SFTD measurement report, and where the first signal may be a SSB that includes a SSB index or a half-frame index, and the report indicates a timing difference between the SSB and a frame boundary of the serving cell.

Some examples of the method, UEs, and non-transitory computer-readable medium described herein may further include operations, features, means, or instructions for transmitting a wake-up signal (WUS) to the first neighbor cell to trigger a transmission of a SSB from the first neighbor cell, measuring the timing difference between the SSB and the frame boundary of the serving cell, and transmitting an indication of the timing difference to the serving cell in the report. Some examples of the method, UEs, and non-transitory computer-readable medium described herein may further include operations, features, means, or instructions for receiving, from the first neighbor cell, a reduced-content SSB that does not include a beam index associated with a beam that is used to transmit the SSB and transmitting the report that indicates a timing of the SSB to the serving cell.

In some examples of the method, UEs, and non-transitory computer-readable medium described herein, the timing of the SSB indicates one or more of a system frame number associated with the SSB, a slot index associated with the SSB, a symbol index associated with the SSB, a timing within a search window of receipt of the SSB, or a SSB index of as associated SSB of the serving cell that is received closest in time to the SSB of the first neighbor cell. Some examples of the method, UEs, and non-transitory computer-readable medium described herein may further include operations, features, means, or instructions for receiving, from the first neighbor cell, a reduced-content SSB that does not include a beam index associated with a beam that may be used to transmit the SSB and transmitting, to the serving cell, the report that indicates one or more measured metrics of the SSB.

A method for wireless communication by a serving cell is described. The method may include transmitting, to a UE, a request for a report for one or more neighbor cells, receiving, from the UE, an indication that a first signal of a first neighbor cell that provides information for the report is an on-demand signal, and receiving, from the UE, the report that includes information for the first neighbor cell.

A serving cell for wireless communication is described. The serving cell may include one or more memories storing processor executable code, and one or more processors coupled with the one or more memories. The one or more processors may individually or collectively operable to execute the code to cause the serving cell to transmit, to a UE, a request for a report for one or more neighbor cells, receive, from the UE, an indication that a first signal of a first neighbor cell that provides information for the report is an on-demand signal, and receive, from the UE, the report that includes information for the first neighbor cell.

Another serving cell for wireless communication is described. The serving cell may include means for transmitting, to a UE, a request for a report for one or more neighbor cells, means for receiving, from the UE, an indication that a first signal of a first neighbor cell that provides information for the report is an on-demand signal, and means for receiving, from the UE, the report that includes information for the first neighbor cell.

A non-transitory computer-readable medium storing code for wireless communication is described. The code may include instructions executable by a processor to transmit, to a UE, a request for a report for one or more neighbor cells, receive, from the UE, an indication that a first signal of a first neighbor cell that provides information for the report is an on-demand signal, and receive, from the UE, the report that includes information for the first neighbor cell.

Some examples of the method, serving cells, and non-transitory computer-readable medium described herein may further include operations, features, means, or instructions for configuring the UE to transmit, responsive to the indication that the first signal is an on-demand signal, a transmission request to the first neighbor cell to transmit the on-demand signal. In some examples of the method, serving cells, and non-transitory computer-readable medium described herein, the configuring the UE may include operations, features, means, or instructions for providing one or more threshold values associated with the first neighbor cell, where the transmission request to the first neighbor cell is transmitted responsive to one or more conditions of the first neighbor cell meeting the one or more threshold values.

In some examples of the method, serving cells, and non-transitory computer-readable medium described herein, the one or more conditions comprise one or more of a cell identification of the first neighbor cell that is included in a list of cells for which the UE is to report a CGI, a list of cells for which the UE is to report a SFTD measurement, or a separate list of cells provided by the serving cell, a RSRP associated with the first neighbor cell that exceeds a RSRP threshold value, a RSSI associated with the first neighbor cell that exceeds a RSSI threshold value, or a SNR associated with the first neighbor cell that exceeds a SNR threshold value.

In some examples of the method, serving cells, and non-transitory computer-readable medium described herein, the transmitting the request for the report may include operations, features, means, or instructions for transmitting a request for a CGI report, and where the first signal is a SSB or RMSI that includes a cell identification of the first neighbor cell. In some examples of the method, serving cells, and non-transitory computer-readable medium described herein, the indication from the UE indicates that the on-demand signal of the first neighbor cell is an on-demand system information block.

Some examples of the method, serving cells, and non-transitory computer-readable medium described herein may further include operations, features, means, or instructions for transmitting, to the UE, an indication to request the on-demand system information block of the first neighbor cell, where the report includes information from the on-demand system information block of the first neighbor cell. Some examples of the method, serving cells, and non-transitory computer-readable medium described herein may further include operations, features, means, or instructions for receiving a capability indication that the UE is capable of transmitting a demand signal to neighboring cells for reports, and where the report is provided responsive to transmission of the demand signal to the first neighbor cell.

In some examples of the method, serving cells, and non-transitory computer-readable medium described herein, the transmitting the request for the report may include operations, features, means, or instructions for transmitting a request for a SFTD measurement report, and where the first signal is a SSB that includes a SSB index or a half-frame index, and the report indicates a timing difference between the SSB of the first neighbor cell and a frame boundary of the serving cell. In some examples of the method, serving cells, and non-transitory computer-readable medium described herein, the report indicates one or more measured metrics of a SSB transmitted by the first neighbor cell, where the SSB may be a reduced-content SSB that does not include a beam index associated with a beam that is used to transmit the SSB.

DETAILED DESCRIPTION

Figure 1:
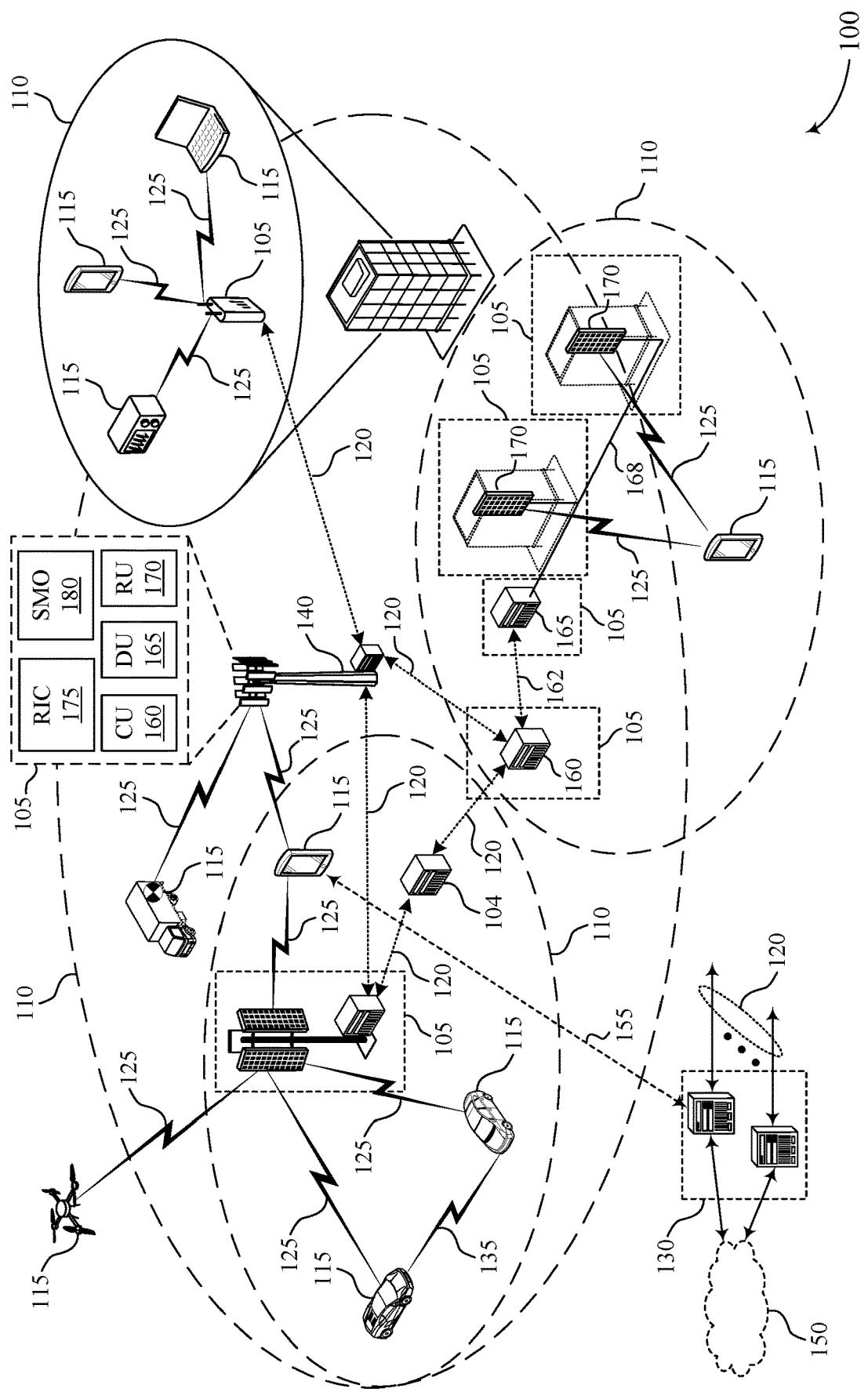
FIG. 1 shows an example of a wireless communications system that supports techniques for neighbor cell measurement in wireless communications systems in accordance with one or more aspects of the present disclosure.

A wireless communications system may include a device, such as a user equipment (UE) or a network entity (e.g., an eNodeB (eNB), a next-generation NodeB or a giga-NodeB, either of which may be referred to as a gNB, or some other base station or network entity), that supports wireless communications using one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems and beyond).

In some wireless communications systems, such as some 5G or 6G systems, a relatively large amount of power may be consumed by network components in some situations. For example, a network entity in a system that uses beamformed communications, such as a radio unit (RU), a radio head, or a transmission-reception point (TRP), may transmit multiple directional beams in multiple directions. Such systems may provide information for use by a UE to access the wireless communications system (e.g., system information that provides parameters for system access) using beam sweeping techniques in which information is provided in multiple different transmissions in multiple different directions. For example, multiple instances of synchronization signal blocks (SSBs) and system information (SI) transmissions (e.g., remaining minimum system information (RMSI) transmissions) may be transmitted across multiple beams in multiple different directions according to a beam sweeping procedure. Such beam sweeping techniques may consume additional power relative to techniques that do not use beam sweeping (e.g., information provided in a single omnidirectional transmission may consume less power than transmission of multiple instances of the information in multiple different directions). Further, such beam sweeping transmissions may be transmitted on multiple different cells, such as a primary cell (PCell) and one or more secondary cells (SCells).

In accordance with some aspects as discussed herein, in order to reduce network power consumption, a network entity may dynamically activate or deactivate one or more cells or TRPs, which may provide energy savings due to a reduced amount of transmissions when one or more cells or TRPs are deactivated. Such dynamic activation and deactivation may also allow for relatively fast adaptation of a quantity of activated or deactivated cells based on an amount of data traffic that is present for transmission. For example, during a first time period there may be no traffic or a light traffic load in one or more cells, and the network entity may deactivate the one or more cells and provide only periodic transmissions on the cell(s) (e.g., SSB and SI transmissions) while discontinuing data communications (e.g., shared channel communications) and periodic monitoring (e.g., monitoring for random access requests or small data transmission (SDT) communications) on the one or more cells. If an amount of data traffic increases such that one or more currently active cells are unable to service the data traffic within latency targets, one or more of the deactivated cells may be activated and used for data communications. In some cases, such dynamic cell activation and deactivation may be implemented on one or more SCells, which may have less control communications than a PCell and thus are more likely to have periods with light or no traffic, although such techniques may also be used in PCells in some conditions. Network devices that operate in NES modes, in some cases, may transmit a "light SSB," an on-demand SSB, or both, where a light SSB includes less information than a standard SSB (e.g., no beam index, no indication of RMSI location, etc.), and on-demand SSB may be transmitted only in response to a demand (e.g., a wake-up signal (WUS)) from a UE. NES techniques may also include on-demand RMSI, where RMSI is transmitted only on request.

In some cases, a UE may be served by a serving cell, and may obtain information, measurements, or both, from one or more neighbor cells. Such information or measurements may be provided to the serving cell in one or more neighbor cell reports (e.g., in a cell global identity (CGI) report or a system frame number and frame timing difference (SFTD) report), and the serving cell may use such information for management of communications (e.g., for coordination of communications with neighbor cells, procedures for UE handovers to neighbor cells, etc.). In the event that a neighbor cell is operating in a NES mode, however, a UE may be unable to provide some information associated with the neighbor cell, due to the neighbor cell transmitting light SSBs, on-demand SSBs, on-demand RMSI, or any combinations thereof.

In accordance with various aspects discussed herein, techniques are provided in which a UE may report information associated with neighbor cells when one or more of the neighbor cells are operating in an energy saving mode. In some aspects, a serving cell may request a neighbor cell report from a served UE and, if a neighboring cell is in a NES mode, the served UE may provide an indication that the neighbor cell is in the NES mode (e.g., provide an indication that a SSB or RMSI of the neighbor cell is provided only on-demand). In some aspects, the UE may transmit a demand for the on-demand signal from the neighbor cell (e.g., a WUS to trigger a SSB or RMSI transmission). In some cases, the serving cell may provide one or more conditions to the UE (e.g., a received power threshold, or specific cell IDs) and, if the condition(s) are met, the UE may autonomously transmit the demand for the on-demand signal. In some aspects, the UE may indicate to the serving cell that the neighbor cell has on-demand SSB, and the serving cell may indicate to the UE that a WUS is to be transmitted.

The neighbor cell report, in some aspects, may be a CGI report, a SFTD report, a measurement report, or any combinations thereof. In some aspects, when transmitting a CGI report, the UE may transmit a cell identification for the neighbor cell, along with an indication that the cell is in an NES mode. Additionally, or alternatively, when transmitting a SFTD report the UE may transmit cell timing for the neighbor cell along with an indication that the cell is in an NES mode. Additionally, or alternatively, the UE may provide a measurement report for the neighbor cells that indicates signal measurements of the neighbor cell (e.g., reference signal received power (RSRP), received signal strength indicator (RSSI), reference signal received quality (RSRQ), signal to interference and noise ratio (SINR), etc.). The measurement report may provide beam measurements and, in cases where a beam index is not provided by the neighbor cell, an indication of timing information (e.g., SFN, slot index, symbol index, timing with respect to a measurement window, and/or closest SSB index of the serving cell).

Various techniques as discussed herein may provide one or more UE and network enhancements and efficiencies. For example, neighbor cell reports may enable a network entity to transition one or more cells between an activated and deactivated state to provide for network power savings and flexibility for scheduling data traffic communications. Such techniques may provide for enhanced communications bandwidth for communications with reduced latency, and also provide for reduced power consumption, thus enhancing system efficiency and providing an enhanced user experience.

Aspects of the disclosure are initially described in the context of wireless communications systems. Aspects of the disclosure are further illustrated by and described with reference to process flows, apparatus diagrams, system diagrams, and flowcharts that relate to techniques for neighbor cell measurement in wireless communications systems.

FIG. 1 shows an example of a wireless communications system 100 that supports techniques for neighbor cell measurement in wireless communications systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for neighbor cell measurement in wireless communications systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some aspects one or more UEs 115 may report information associated with neighbor cells when one or more of the neighbor cells are operating in an energy saving mode. In some cases, a serving cell of a network entity 105 may request a neighbor cell report from a served UE 115 and, if a neighboring cell is in a NES mode, the served UE 115 may provide an indication that the neighbor cell is in the NES mode (e.g., provide an indication that a SSB or RMSI of the neighbor cell is provided only on-demand). In some aspects, the UE 115 may transmit a demand for the on-demand signal from the neighbor cell (e.g., a WUS to trigger a SSB or RMSI transmission), and monitor for the subsequent signal. The UE 115 may transmit the neighbor cell report to the serving cell based on information provided from one or more of the transmissions of the neighbor cell (e.g., a CGI report, a SFTD report, a measurement report, or any combinations thereof).

Figure 2:
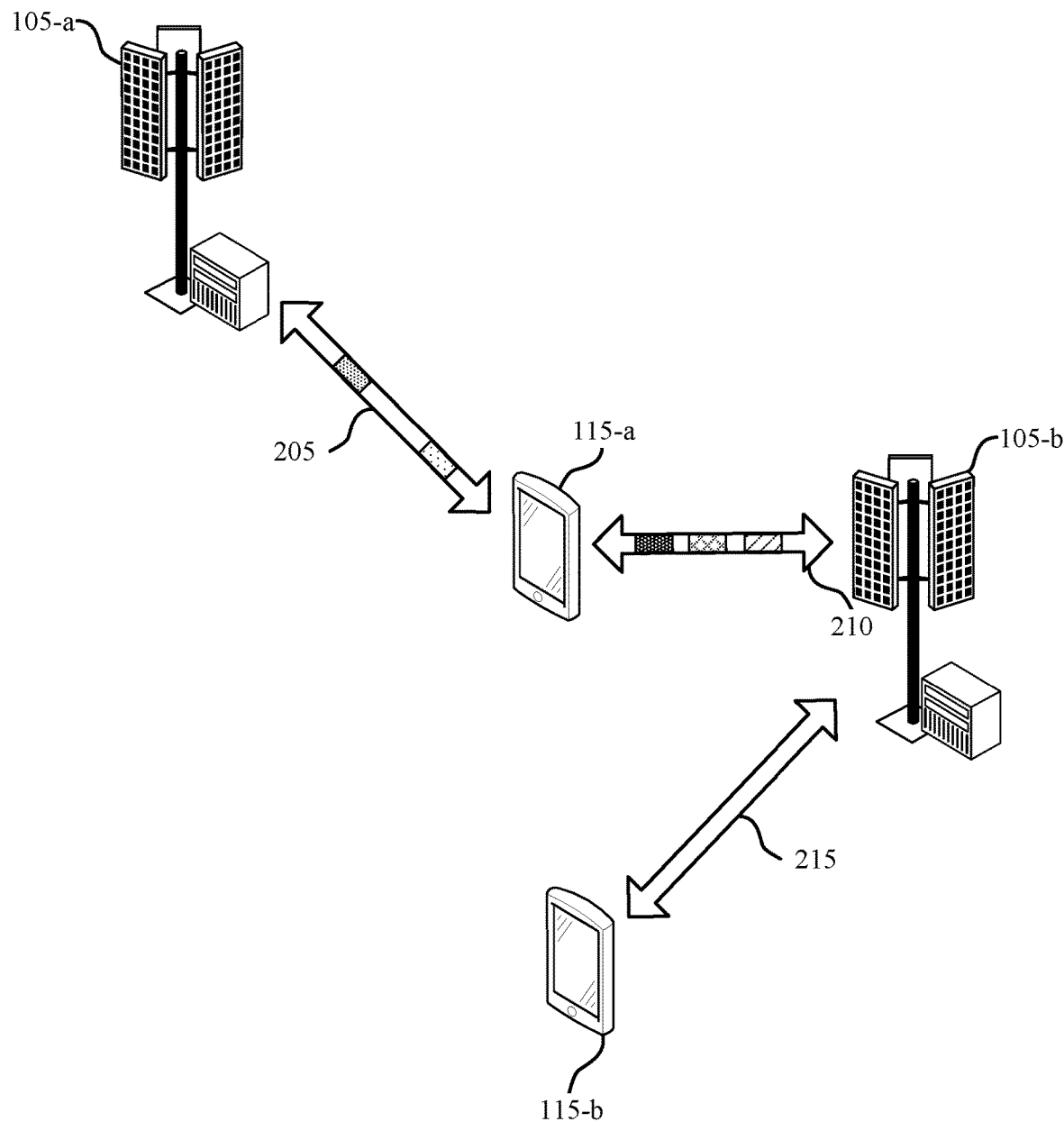
FIG. 2 shows another example of a wireless communications system that supports techniques for neighbor cell measurement in wireless communications systems in accordance with one or more aspects of the present disclosure.

FIG. 2 shows an example of a wireless communications system 200 that supports techniques for neighbor cell measurement in wireless communications systems in accordance with one or more aspects of the present disclosure. The wireless communications system 200 may implement or be implemented by aspects of the wireless communications system 100. For example, the wireless communications system 200 may include a first network entity 105-*a* that may provide a serving cell to a first UE 115-*a*, and a second network entity 105-*b* that may provide a serving cell to a second UE 115-*b*, where one or more serving cells provided by the second network entity 105-*b* may be neighboring cells to the serving cell of the first UE 115-*a*. The network entities 105 and UEs 115 may be examples of network entities 105 (e.g., an RU 170, a DU 165, a CU 160, a base station 140, or some combination thereof) and UEs 115 as described with reference to FIG. 1. The first network entity 105-*a* and the first UE 115-*a* may communicate with one another via an access link 205 (e.g., a Uu link) and the second network entity 105-*b* and the second UE 115-*b* may communicate with one another via access link 215 (e.g., a Uu link), which may be examples or components of communication links 125 as described with reference to FIG. 1. The UEs 115 and network entities 105 may support techniques for neighbor cell measurement in wireless communications systems, which may enable the network to perform efficient network management, which may reduce power consumption and enhance scheduling flexibility associated with concurrent communications via multiple cells, and which may promote resource efficiency and reduced latency, while also providing for reduced power consumption for the wireless communications system 200.

In the example of FIG. 2, the first network entity 105-*a* may transmit a neighbor cell report request 220 to the first UE 115-*a*. In some cases, the neighbor cell report request 220 may be a CGI report request, a SFTD report request, a measurement report request, or any combinations thereof. Additionally, or alternatively, the neighbor cell report request 220 may include one or more conditions (e.g., one or more thresholds for RSRP, RSSP, RSRQ, SINR, or any combinations thereof) for transmission of a signal (e.g., a WUS) to demand an on-demand signal from one or more neighbor cells that are operating in an NES mode. In other cases, the first network entity 105-*a* may configure the first UE 115-*a* with such conditions in separate configuration information (e.g., provided via RRC signaling, or a medium access control (MAC) control element (CE)). In some cases, such conditions may be provided based on a capability indication of the first UE 115-*a* that indicates support for transmission of such WUSs.

Figure 3:
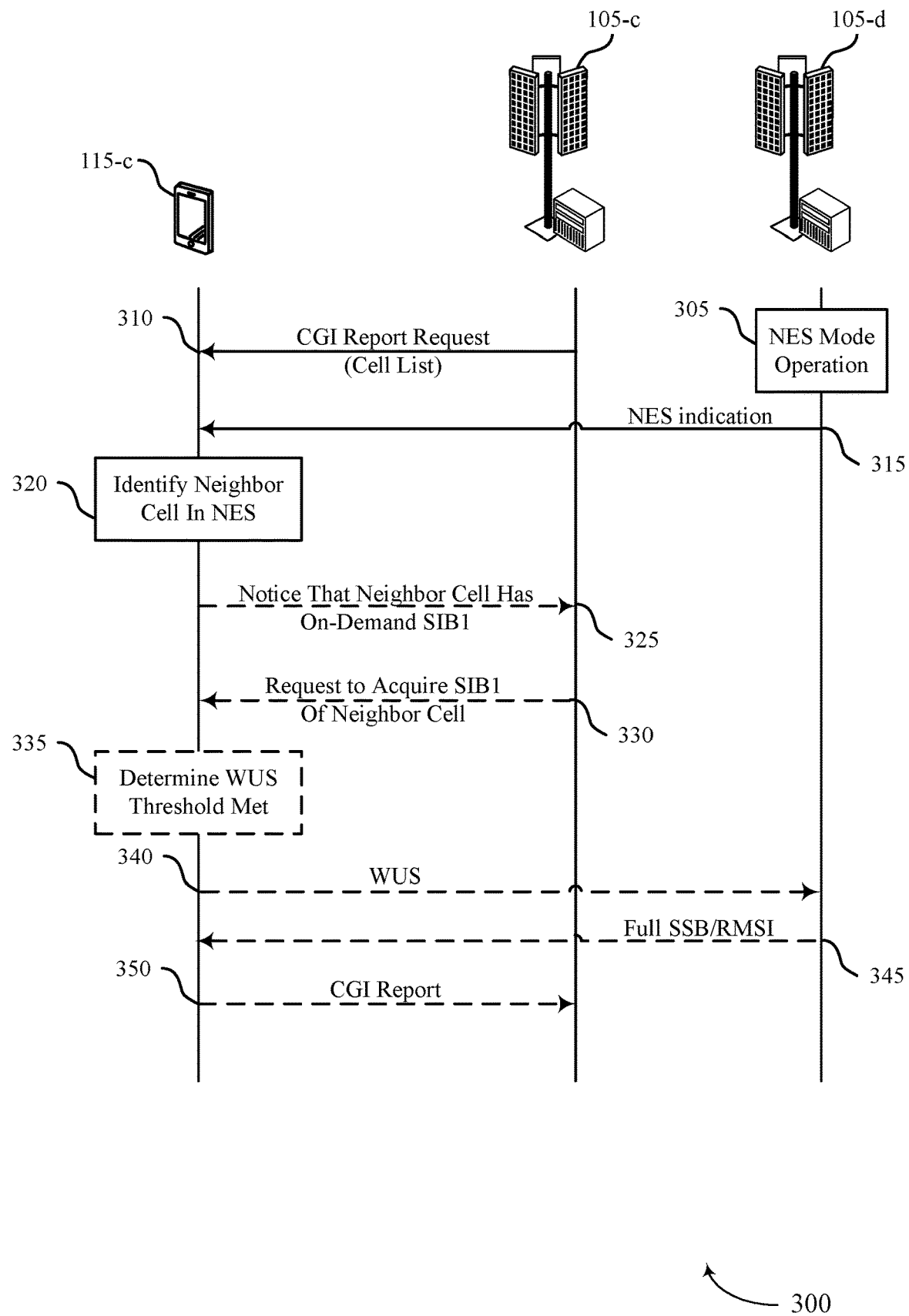
FIGS. 3 through 5 show examples of process flows that support techniques for neighbor cell measurement in wireless communications systems in accordance with one or more aspects of the present disclosure.
Figure 4:
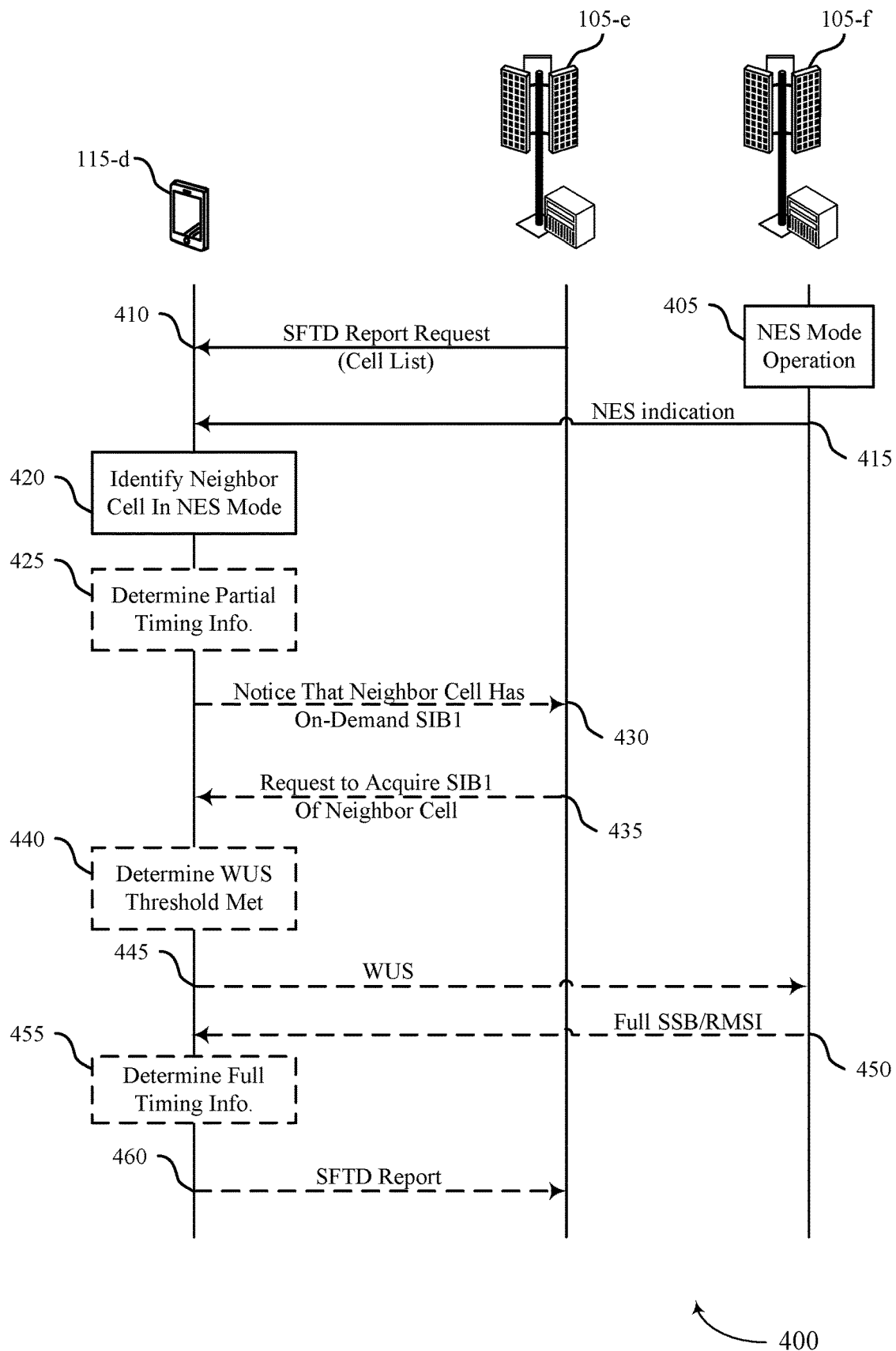
Figure 5:
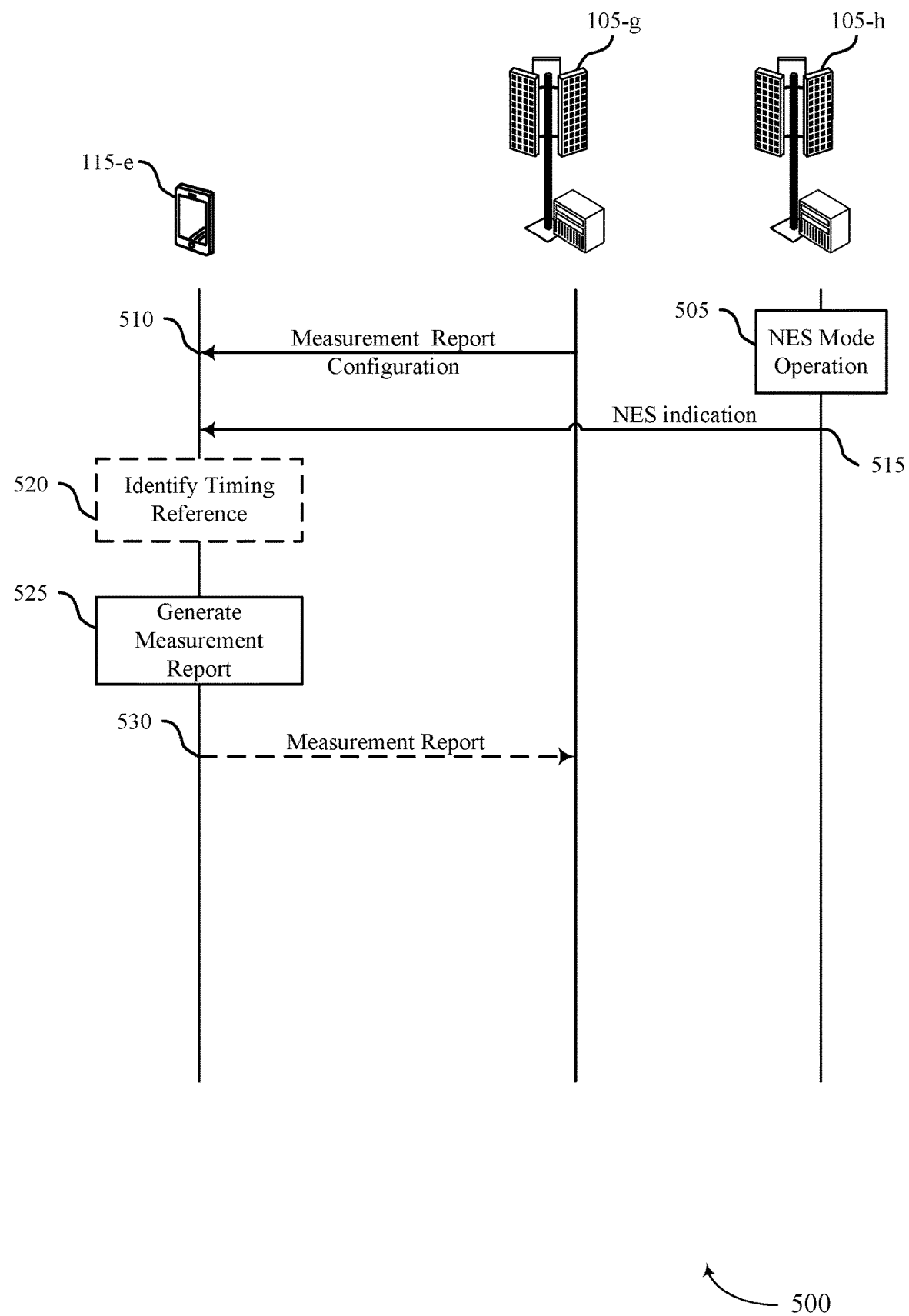

In the example of FIG. 2, a neighboring cell provided by the second network entity 105-*b* may be in a NES mode, the first UE 115-*a* may monitor broadcast communications of the neighboring cell (e.g., via link 210) and receive an on-demand SI indication 225. For example, the on-demand SI indication 225 may indicate that a SSB or RMSI is provided by the neighboring cell on-demand. In some cases, the first UE 115-*a* may transmit a neighbor NES notice 230 to the serving cell at the first network entity 105-*a*. In some cases, the first network entity 105-*a* may identify the neighboring cell as in a NES mode and wait for subsequent neighbor cell reports to obtain subsequent information associated with the neighbor cell(s). In other cases, the first network entity 105-*a* may indicate to the first UE 115-*a* that a demand for the on-demand signal from the neighbor cell is to be transmitted. In such cases, the first UE 115-*a* the demand, such as WUS 235, to the neighbor cell at the second network entity 105-*b* (e.g., using random access resources of link 210). In response to the WUS 235, the neighbor cell may transmit a full SSB/RMSI 240, that may be received at the first UE 115-*a*. Such information may be provided to the serving cell in a neighbor cell report. The neighbor cell report, in some aspects, may be a CGI report, a SFTD report, a measurement report, or any combinations thereof. In some aspects, when transmitting a CGI report, the first UE 115-*a* may transmit a cell identification for the neighbor cell, along with an indication that the cell is in an NES mode. Additionally, or alternatively, when transmitting a SFTD report the first UE 115-*a* may transmit cell timing for the neighbor cell along with an indication that the cell is in an NES mode. Additionally, or alternatively, the first UE 115-*a* may provide a measurement report for the neighbor cells that indicates signal measurements of the neighbor cell (e.g., RSRP, RSSI, RSRQ, SINR, etc.). The measurement report may provide beam measurements and, in cases where a beam index is not provided by the neighbor cell, an indication of timing information (e.g., SFN, slot index, symbol index, timing with respect to a measurement window, and/or closest SSB index of the serving cell). FIGS. 3 through 5 illustrate exemplary process flows associated with neighbor cell reports in accordance with various aspects.

FIG. 3 shows an example of a process flow 300 that supports techniques for neighbor cell measurement in wireless communications systems in accordance with one or more aspects of the present disclosure. The process flow 300 may include a first network entity 105-c, a second network entity 105-d, and a UE 115-c, which may be examples of a network entity 105 and a UE 115 as described with reference to FIGS. 1 and 2. In some cases, the process flow 300 may be implemented by the network entities 105 and the UE 115-c where a capability indication from the UE 115-c provides an indication of support for neighbor cell reporting in NES modes. Such techniques may provide for power savings at the network entities 105 associated with a activation and inactivation of one or more cells, while also providing scheduling flexibility for cells provided through the network entities 105, which may thereby enhance overall network efficiency and user experience. In the following description of the process flow 300, the operations between the network entities 105 and the UE 115-c may be performed in a different order than the example order shown. Some operations may be omitted from the process flow 300, and other operations may be added to the process flow 300.

At 305, the second network entity 105-d may enter into a NES mode of operation for one or more cells, including a neighboring cell to a serving cell that is provided by the first network entity 105-c. In some cases, the NES operation may initiated based on a traffic load of the neighboring cell, and one or more signals (e.g., SSB, RMSI) of the neighboring cell may be transmitted only on-demand.

At 310, the first network entity 105-c may transmit, and the UE 115-c may receive, a CGI report request. In some cases, the UE 115-c may be asked to report CGI for a list of neighboring cells, where the UE 115-c may be provided a list of cells (e.g., by an information element (IE) cellFor Which ToReportCGJ). In some cases, if the UE 115-c detects a cell in this list, it may report such detection. For example, if the cell broadcasts RMSI (e.g., including SIB1), the UE 115-c may to decode RMSI, read and report CGI, along with other information (e.g., an associated tracking area, etc.). However, in the example of FIG. 3, the neighboring cell in NES mode may not broadcast RMSI, and in traditional systems the UE 115-c may report "noSIB1" along with some other info acquired from an associated master information block (MIB), such as a subcarrier offset (e.g., ssb-SubcarrierOffset), for example.

At 315, the neighboring cell at the second network entity 105-d may transmit, and the UE 115-c may receive, a NES indication. For example, the NES indication may be a light SSB (e.g., that includes a primary synchronization signal (PSS), a secondary synchronization signal (SSS), and a reduced-information physical broadcast channel (PBCH) that provides a MIB but does not indicate resources for RMSI), which may indicate that a full SSB and RMSI are transmitted only on-demand while the cell is in the NES mode. At 320, the UE 115-c may identify that the neighbor cell is in an NES mode.

Optionally, at 325, the UE 115-c may provide a notice to the serving cell that a detected neighbor cell has on-demand SIB1 (e.g., broadcasts RMSI on-demand). In some cases, such the UE 115-c may include an IE (e.g., an IE "onDemandSIB1") in its CGI report. Additionally, in some cases, such a CGI report may include other related information that may have been acquired via MIB.

In some cases, at 330, the first network entity 105-c may transmit, and UE 115-c may receive, a request to acquire SIB1 of the neighbor cell. In some cases, the UE 115-c may be provided with conditions for sending a WUS and acquiring RMSI. For example, a condition may be that a cell whose identification is in the cell list (e.g., is included in cellFor Which ToReportCGI) may be qualified for waking up (e.g., via WUS). Alternatively, a separate list of cell IDs may be indicated for this purpose. In some cases, one or more thresholds (e.g., RSRP/RSSI/SNR thresholds on SSB, light SSB, or a discovery signal) may be provided to evaluate whether the UE 115-c should send the WUS or not. In some cases, such thresholds may be relative to the serving cell and/or other neighboring cells. Alternatively, such thresholds may be common or cell-specific, or may further be beam-specific.

At 335, the UE 115-c may determine that a WUS threshold is met. At 340, the UE 115-c may transmit, and the second network entity 105-d may receive, a WUS that indicates that the on-demand RMSI is to be transmitted. In some cases, such thresholds may be provided with configuration information. In other cases, such thresholds may be provided after the UE 115-c indicates the neighboring cell is in the NES mode. In some cases, the request to acquire SIB1 for the neighbor cell, the threshold information, or both may be provided via RRC, or lower-layer signaling (e.g., L1/L2 signaling).

At 345, the neighboring cell at the second network entity 105-d may transmit the full SSB, RMSI, or both, responsive to the WUS. At 350, the UE 115-c may transmit, and the serving cell may receive, a CGI report that includes information provided by the RMSI.

FIG. 4 shows an example of a process flow 400 that supports techniques for neighbor cell measurement in wireless communications systems in accordance with one or more aspects of the present disclosure. The process flow 400 may include a first network entity 105-e, a second network entity 105-f, and a UE 115-d, which may be examples of a network entity 105 and a UE 115 as described with reference to FIGS. 1 and 2. In some cases, the process flow 400 may be implemented by the network entities 105 and the UE 115-d where a capability indication from the UE 115-d provides an indication of support for neighbor cell reporting in NES modes. Such techniques may provide for power savings at the network entities 105 associated with a activation and inactivation of one or more cells, while also providing scheduling flexibility for cells provided through the network entities 105, which may thereby enhance overall network efficiency and user experience. In the following description of the process flow 400, the operations between the network entities 105 and the UE 115-d may be performed in a different order than the example order shown. Some operations may be omitted from the process flow 400, and other operations may be added to the process flow 400.

At 405, the second network entity 105-f may enter into a NES mode of operation for one or more cells, including a neighboring cell to a serving cell that is provided by the first network entity 105-e. In some cases, the NES operation may initiated based on a traffic load of the neighboring cell, and one or more signals (e.g., SSB, RMSI) of the neighboring cell may be transmitted only on-demand.

At 410, the first network entity 105-e may transmit, and the UE 115-d may receive, a SFTD report request. In some cases, the UE 115-d may be asked to report SFTD for a list of neighboring cells, where the UE 115-d may be provided a list of cells (e.g., by an information element (IE) cellFor Which ToReportSFTD that may include up to three cells).

At 415, the neighboring cell at the second network entity 105-f may transmit, and the UE 115-d may receive, a NES indication. For example, the NES indication may be a light SSB (e.g., that includes a primary synchronization signal (PSS), a secondary synchronization signal (SSS), and a reduced-information physical broadcast channel (PBCH) that provides a MIB but does not indicate SFN information), which may indicate that a full SSB and RMSI are transmitted only on-demand while the cell is in the NES mode. At 420, the UE 115-d may identify that the neighbor cell is in an NES mode.

In some cases, if the UE 115-d detects a neighbor cell in SFTD list and the neighbor cell is not in NES mode, the UE 115-d may acquire information about the frame boundary (e.g., via SSB index and half-frame index provided in SSB) and system frame number (e.g., via a SFN provided in MIB) of the cell, and calculate and report the difference to the serving cell (e.g., a PCell) frame boundary and SFN. However, in the example of FIG. 4, the neighboring cell in NES mode may not broadcast the full SSB with SFN information or RMSI. In some cases, the UE 115-d simply may not provide any report related to SFTD for the detected cell.

In other cases, the UE 115-d may optionally, at 425, determine partial timing information. For example, the neighboring cell of the second network entity 105-f may transmit a light SSB that provides partial timing information (e.g., SSB index but not SFN information), and determine such partial timing information, which may be provided with a SFTD report to the serving cell.

Optionally, at 430, the UE 115-d may provide a notice to the serving cell that a detected neighbor cell has on-demand SSB or SIB1 (e.g., broadcasts SSB/RMSI on-demand). In some cases, such the UE 115-d may include an IE (e.g., an IE that indicates the requested cell has "onDemandSSB," or that SFN/beam index can be provided on demand). In some cases, at 435, the first network entity 105-e may transmit, and UE 115-d may receive, a request to acquire SIB1 of the neighbor cell. In some cases, the UE 115-d may be provided with conditions for sending a WUS and acquiring RMSI/SIB1. For example, a condition may be that a cell whose identification is in the cell list (e.g., is included in cellFor Which ToReportSFTD) may be qualified for waking up (e.g., via WUS). Alternatively, a separate list of cell IDs may be indicated for this purpose. In some cases, one or more thresholds (e.g., RSRP/RSSI/SNR thresholds on SSB, light SSB, or a discovery signal) may be provided to evaluate whether the UE 115-d should send the WUS or not. In some cases, such thresholds may be relative to the serving cell and/or other neighboring cells. Alternatively, such thresholds may be common or cell-specific, or may further be beam-specific.

At 440, the UE 115-d may determine that a WUS threshold is met. At 445, the UE 115-d may transmit, and the second network entity 105-f may receive, a WUS that indicates that the on-demand SSB/RMSI is to be transmitted. In some cases, such thresholds may be provided with configuration information. In other cases, such thresholds may be provided after the UE 115-d indicates the neighboring cell is in the NES mode. In some cases, the request to acquire SSB/RMSI for the neighbor cell, the threshold information, or both may be provided via RRC, or lower-layer signaling (e.g., L1/L2 signaling).

At 450, the neighboring cell at the second network entity 105-f may transmit the full SSB, RMSI, or both, responsive to the WUS. At 455, the UE 115-d may determine timing information based on the full SSB/RMSI, At 460, the UE 115-d may transmit, and the serving cell may receive, a SFTD report that includes timing measurements between the neighbor cell and the serving cell (e.g., PCell).

FIG. 5 shows an example of a process flow 500 that supports techniques for neighbor cell measurement in wireless communications systems in accordance with one or more aspects of the present disclosure. The process flow 500 may include a first network entity 105-g, a second network entity 105-h, and a UE 115-e, which may be examples of a network entity 105 and a UE 115 as described with reference to FIGS. 1 and 2. In some cases, the process flow 500 may be implemented by the network entities 105 and the UE 115-e where a capability indication from the UE 115-e provides an indication of support for neighbor cell reporting in NES modes. Such techniques may provide for power savings at the network entities 105 associated with a activation and inactivation of one or more cells, while also providing scheduling flexibility for cells provided through the network entities 105, which may thereby enhance overall network efficiency and user experience. In the following description of the process flow 500, the operations between the network entities 105 and the UE 115-e may be performed in a different order than the example order shown. Some operations may be omitted from the process flow 500, and other operations may be added to the process flow 500.

At 505, the second network entity 105-h may enter into a NES mode of operation for one or more cells, including a neighboring cell to a serving cell that is provided by the first network entity 105-g. In some cases, the NES operation may initiated based on a traffic load of the neighboring cell, and one or more signals (e.g., SSB, RMSI) of the neighboring cell may be transmitted only on-demand.

At 510, the first network entity 105-g may transmit, and the UE 115-e may receive, a measurement report configuration. In some cases, the UE 115-e may be asked to report measurements for one or more neighboring cells in one or more beam-level measurement reports. In some cases, such measurement reports may provide a beam index for the detected neighbor cells.

At 515, the neighboring cell at the second network entity 105-h may transmit, and the UE 115-e may receive, a NES indication. For example, the NES indication may be a light SSB (e.g., that includes a primary synchronization signal (PSS), a secondary synchronization signal (SSS), and a reduced-information physical broadcast channel (PBCH) that provides a MIB but does not indicate SFN information), which may indicate that a full SSB and RMSI are transmitted only on-demand while the cell is in the NES mode. The UE 115-e may identify that the neighbor cell is in an NES mode and, at 520, may optionally identify a timing reference for the neighboring cell. For example, if a beam ID is not carried by light SSB, the UE 115-e may provide other type of timing information (e.g., as part of SFTD, or beam-level RSRP measurements). Such timing information may be, for example, a report of the timing of the light SSB based on the serving cell (e.g., PCell) timing reference (such as, which SFN, slot index, and/or symbol index in which the light SSB was detected). In some cases, if a smaller search window is provided to the UE 115-e (e.g., in a SMTC window), the UE 115-e may indicate the timing with respect to the provided window (e.g., via slot/symbol offsets to the start of the window). In some cases, if the two cells are relatively synchronized, the UE 115-e may report the closest SSB index (or indices) of the serving cell to the light SSB detected from the neighbor cell. In further examples, the UE 115-e may report the measured metrics (e.g., RSRP, RSRQ, SINR) for one or multiple detected light SSBs without including the related SSB indices.

At 525, the UE 115-*e* may generate a measurement report with one or more items as discussed. At 530, the UE 115-*e* may transmit the measurement report, which may be received at the serving cell of the first network entity 105-*g*.

Figure 6:
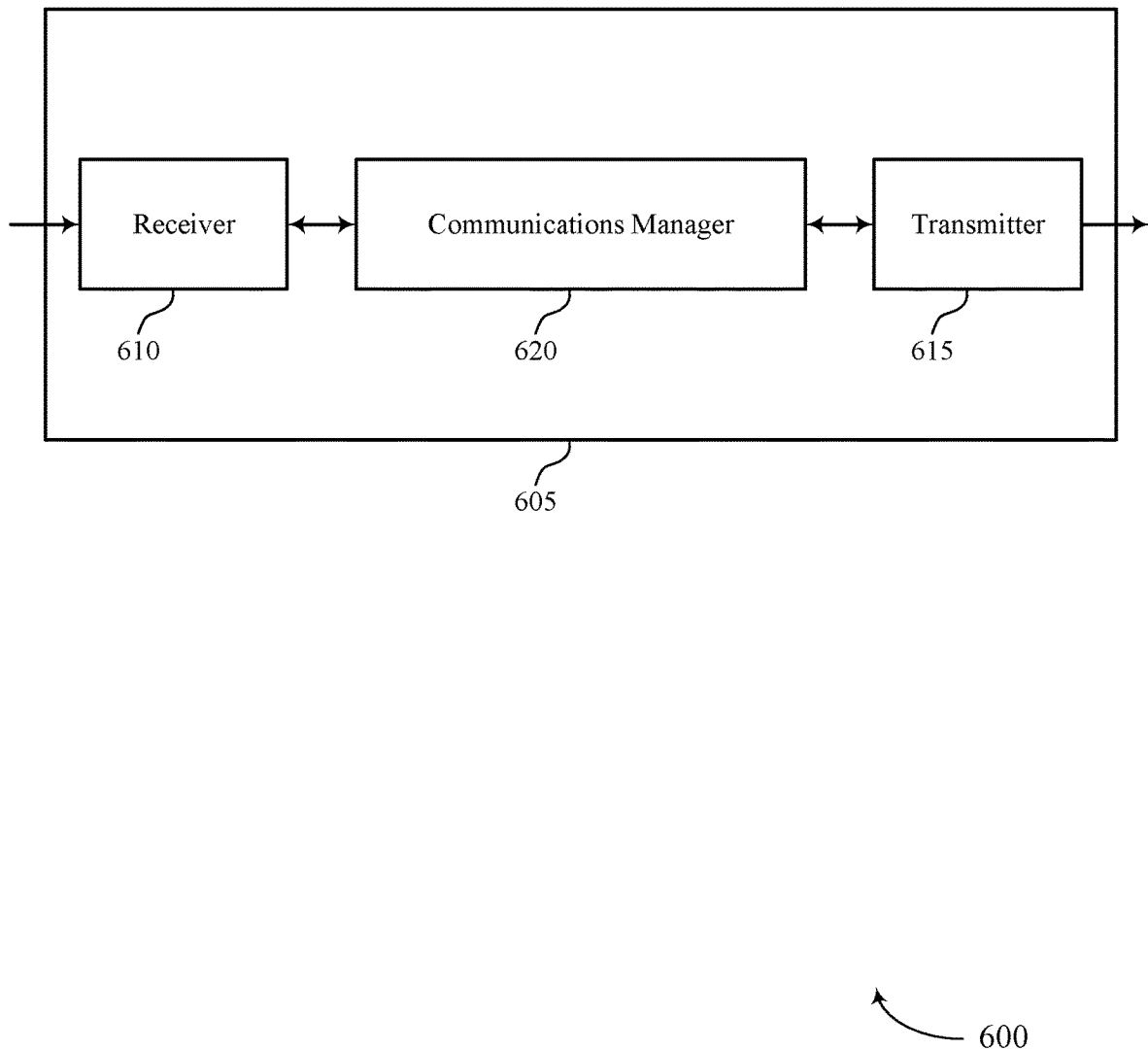
FIGS. 6 and 7 show block diagrams of devices that support techniques for neighbor cell measurement in wireless communications systems in accordance with one or more aspects of the present disclosure.

FIG. 6 shows a block diagram 600 of a device 605 that supports techniques for neighbor cell measurement in wireless communications systems in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for neighbor cell measurement in wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for neighbor cell measurement in wireless communications systems). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for neighbor cell measurement in wireless communications systems as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. For example, the communications manager 620 is capable of, configured to, or operable to support a means for receiving, from a serving cell, a request for a report for one or more neighbor cells. The communications manager 620 is capable of, configured to, or operable to support a means for receiving an indication from a first neighbor cell of the one or more neighbor cells that a first signal that provides information for the report from the first neighbor cell is an on-demand signal. The communications manager 620 is capable of, configured to, or operable to support a means for transmitting a notification to the serving cell that indicates the first signal of the first neighbor cell is an on-demand signal.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for neighbor cell reporting of NES-mode neighbor cells, which may provide for more efficient network management, reduced latency, efficient adaptation of transmission parameters for communications, enhanced system efficiency, and enhanced user experience.

Figure 7:
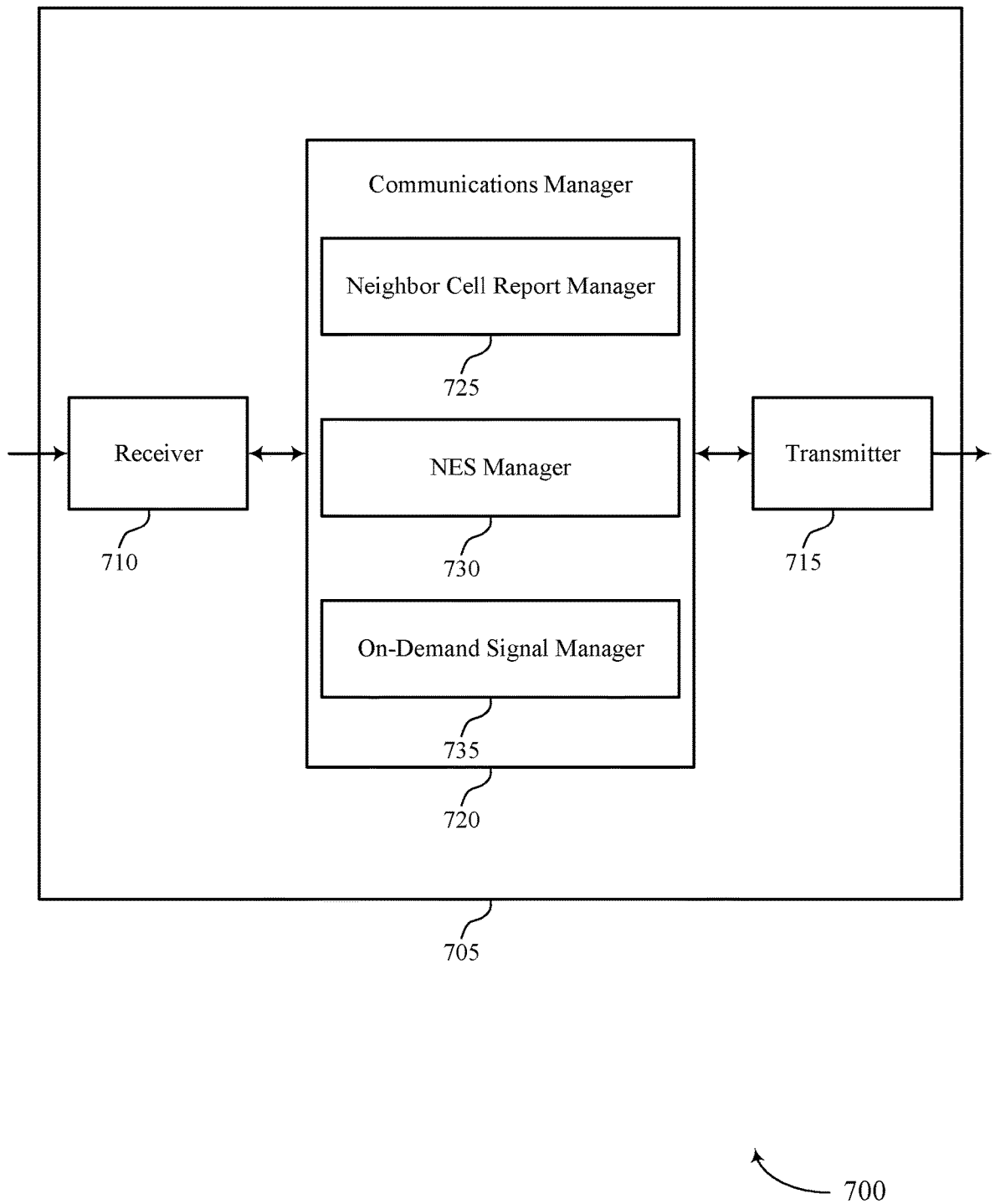

FIG. 7 shows a block diagram 700 of a device 705 that supports techniques for neighbor cell measurement in wireless communications systems in accordance with one or more aspects of the present disclosure. The device 705 may be an example of aspects of a device 605 or a UE 115 as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for neighbor cell measurement in wireless communications systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for neighbor cell measurement in wireless communications systems). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for neighbor cell measurement in wireless communications systems as described herein. For example, the communications manager 720 may include a neighbor cell report manager 725, a NES manager 730, an on-demand signal manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. The neighbor cell report manager 725 is capable of, configured to, or operable to support a means for receiving, from a serving cell, a request for a report for one or more neighbor cells. The NES manager 730 is capable of, configured to, or operable to support a means for receiving an indication from a first neighbor cell of the one or more neighbor cells that a first signal that provides information for the report from the first neighbor cell is an on-demand signal. The on-demand signal manager 735 is capable of, configured to, or operable to support a means for transmitting a notification to the serving cell that indicates the first signal of the first neighbor cell is an on-demand signal.

Figure 8:
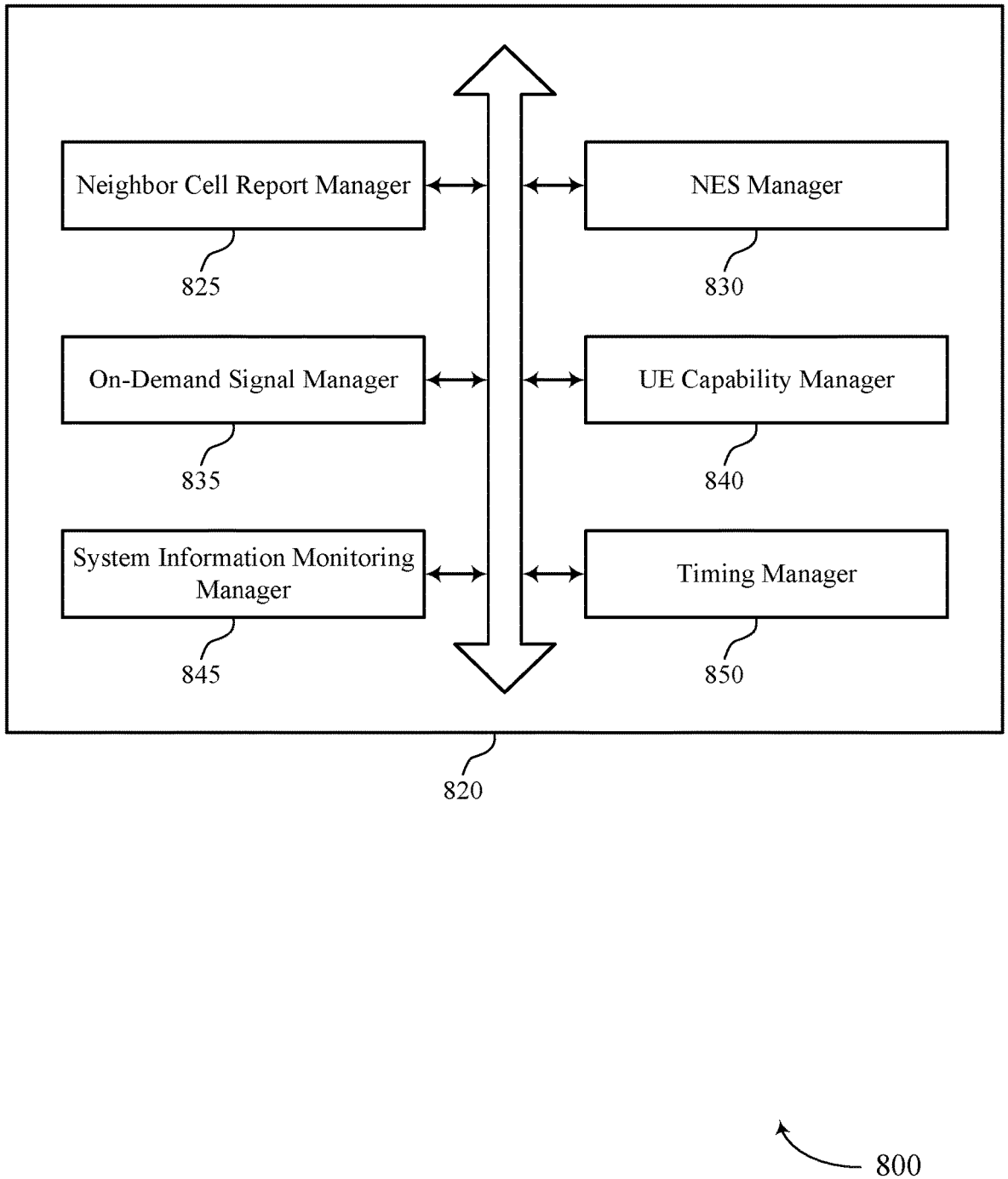
FIG. 8 shows a block diagram of a communications manager that supports techniques for neighbor cell measurement in wireless communications systems in accordance with one or more aspects of the present disclosure.

FIG. 8 shows a block diagram 800 of a communications manager 820 that supports techniques for neighbor cell measurement in wireless communications systems in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for neighbor cell measurement in wireless communications systems as described herein. For example, the communications manager 820 may include a neighbor cell report manager 825, a NES manager 830, an on-demand signal manager 835, a UE capability manager 840, a system information monitoring manager 845, a timing manager 850, or any combination thereof. Each of these components, or components or subcomponents thereof (e.g., one or more processors, one or more memories), may communicate, directly or indirectly, with one another (e.g., via one or more buses).

The communications manager 820 may support wireless communication in accordance with examples as disclosed herein. The neighbor cell report manager 825 is capable of, configured to, or operable to support a means for receiving, from a serving cell, a request for a report for one or more neighbor cells. The NES manager 830 is capable of, configured to, or operable to support a means for receiving an indication from a first neighbor cell of the one or more neighbor cells that a first signal that provides information for the report from the first neighbor cell is an on-demand signal. The on-demand signal manager 835 is capable of, configured to, or operable to support a means for transmitting a notification to the serving cell that indicates the first signal of the first neighbor cell is an on-demand signal.

In some examples, the NES manager 830 is capable of, configured to, or operable to support a means for transmitting, responsive to the indication that the first signal is an on-demand signal, a transmission request to the first neighbor cell to transmit the first signal. In some examples, the neighbor cell report manager 825 is capable of, configured to, or operable to support a means for obtaining information for the report from a transmission of the first signal from the first neighbor cell. In some examples, the neighbor cell report manager 825 is capable of, configured to, or operable to support a means for transmitting the information for the first neighbor cell to the serving cell in the report.

In some examples, the NES manager 830 is capable of, configured to, or operable to support a means for determining that one or more conditions associated with the first neighbor cell meet a threshold value. In some examples, the NES manager 830 is capable of, configured to, or operable to support a means for transmitting a transmission request to the first neighbor cell to transmit the first signal.

In some examples, a cell identification of the first neighbor cell that is included in a list of cells for which the UE is to report a cell global identity (CGI), a list of cells for which the UE is to report a system frame number and frame timing difference (SFTD) measurement, or a separate list of cells provided by the serving cell. In some examples, a reference signal received power (RSRP) associated with the first neighbor cell that exceeds a RSRP threshold value. In some examples, a received signal strength indicator (RSSI) associated with the first neighbor cell that exceeds a RSSI threshold value. In some examples, a signal to noise ratio (SNR) associated with the first neighbor cell that exceeds a SNR threshold value.

In some examples, to support receiving the request for the report, the neighbor cell report manager 825 is capable of, configured to, or operable to support a means for receiving, from the serving cell, a request for a cell global identity (CGI) report, and where the first signal is a synchronization signal block (SSB) or remaining minimum system information (RMSI) that includes a cell identification of the first neighbor cell. In some examples, the notification to the serving cell is an indication that the on-demand signal of the first neighbor cell is an on-demand system information block.

In some examples, the on-demand signal manager 835 is capable of, configured to, or operable to support a means for receiving, from the serving cell, an indication to request the on-demand system information block of the first neighbor cell. In some examples, the NES manager 830 is capable of, configured to, or operable to support a means for transmitting a wake-up signal to the first neighbor cell. In some examples, the system information monitoring manager 845 is capable of, configured to, or operable to support a means for monitoring for the on-demand system information block of the first neighbor cell. In some examples, the neighbor cell report manager 825 is capable of, configured to, or operable to support a means for transmitting the report to the serving cell with information from the on-demand system information block of the first neighbor cell.

In some examples, the UE capability manager 840 is capable of, configured to, or operable to support a means for transmitting a capability indication that the UE is capable of transmitting a demand signal to neighboring cells for reports.

In some examples, to support receiving the request for the report, the neighbor cell report manager 825 is capable of, configured to, or operable to support a means for receiving, from the serving cell, a request for a system frame number and frame timing difference (SFTD) measurement report, and where the first signal is a synchronization signal block (SSB) that includes a SSB index or a half-frame index, and the report indicates a timing difference between the SSB and a frame boundary of the serving cell.

In some examples, the NES manager 830 is capable of, configured to, or operable to support a means for transmitting a wake-up signal (WUS) to the first neighbor cell to trigger a transmission of a SSB from the first neighbor cell. In some examples, the timing manager 850 is capable of, configured to, or operable to support a means for measuring the timing difference between the SSB and the frame boundary of the serving cell. In some examples, the neighbor cell report manager 825 is capable of, configured to, or operable to support a means for transmitting an indication of the timing difference to the serving cell in the report.

In some examples, the system information monitoring manager 845 is capable of, configured to, or operable to support a means for receiving, from the first neighbor cell, a reduced-content synchronization signal block (SSB) that does not include a beam index associated with a beam that is used to transmit the SSB. In some examples, the neighbor cell report manager 825 is capable of, configured to, or operable to support a means for transmitting the report that indicates a timing of the SSB to the serving cell. In some examples, the timing of the SSB indicates one or more of a system frame number associated with the SSB, a slot index associated with the SSB, a symbol index associated with the SSB, a timing within a search window of receipt of the SSB, or a SSB index of as associated SSB of the serving cell that is received closest in time to the SSB of the first neighbor cell.

In some examples, the system information monitoring manager 845 is capable of, configured to, or operable to support a means for receiving, from the first neighbor cell, a reduced-content synchronization signal block (SSB) that does not include a beam index associated with a beam that is used to transmit the SSB. In some examples, the neighbor cell report manager 825 is capable of, configured to, or operable to support a means for transmitting, to the serving cell, the report that indicates one or more measured metrics of the SSB.

Figure 9:
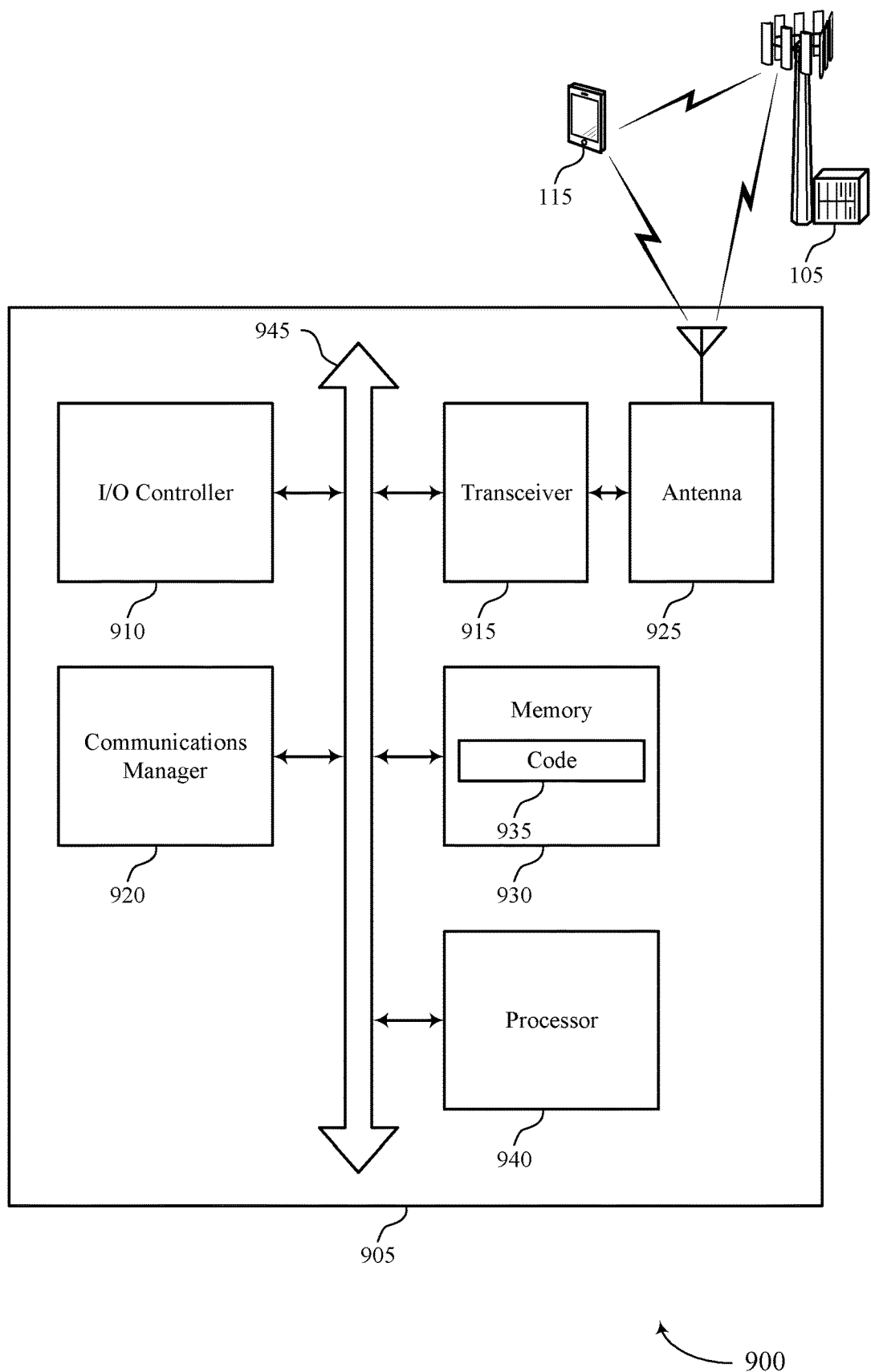
FIG. 9 shows a diagram of a system including a device that supports techniques for neighbor cell measurement in wireless communications systems in accordance with one or more aspects of the present disclosure.

FIG. 9 shows a diagram of a system 900 including a device 905 that supports techniques for neighbor cell measurement in wireless communications systems in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for neighbor cell measurement in wireless communications systems). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communication in accordance with examples as disclosed herein. For example, the communications manager 920 is capable of, configured to, or operable to support a means for receiving, from a serving cell, a request for a report for one or more neighbor cells. The communications manager 920 is capable of, configured to, or operable to support a means for receiving an indication from a first neighbor cell of the one or more neighbor cells that a first signal that provides information for the report from the first neighbor cell is an on-demand signal. The communications manager 920 is capable of, configured to, or operable to support a means for transmitting a notification to the serving cell that indicates the first signal of the first neighbor cell is an on-demand signal.

By including or configuring the communications manager 920 in accordance with examples as described herein, the device 905 may support techniques for neighbor cell reporting of NES-mode neighbor cells, which may provide for more efficient network management, reduced latency, efficient adaptation of transmission parameters for communications, enhanced system efficiency, and enhanced user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for neighbor cell measurement in wireless communications systems as described herein, or the at least one processor 940 and the at least one memory 930 may be otherwise configured to, individually or collectively, perform or support such operations.

Figure 10:
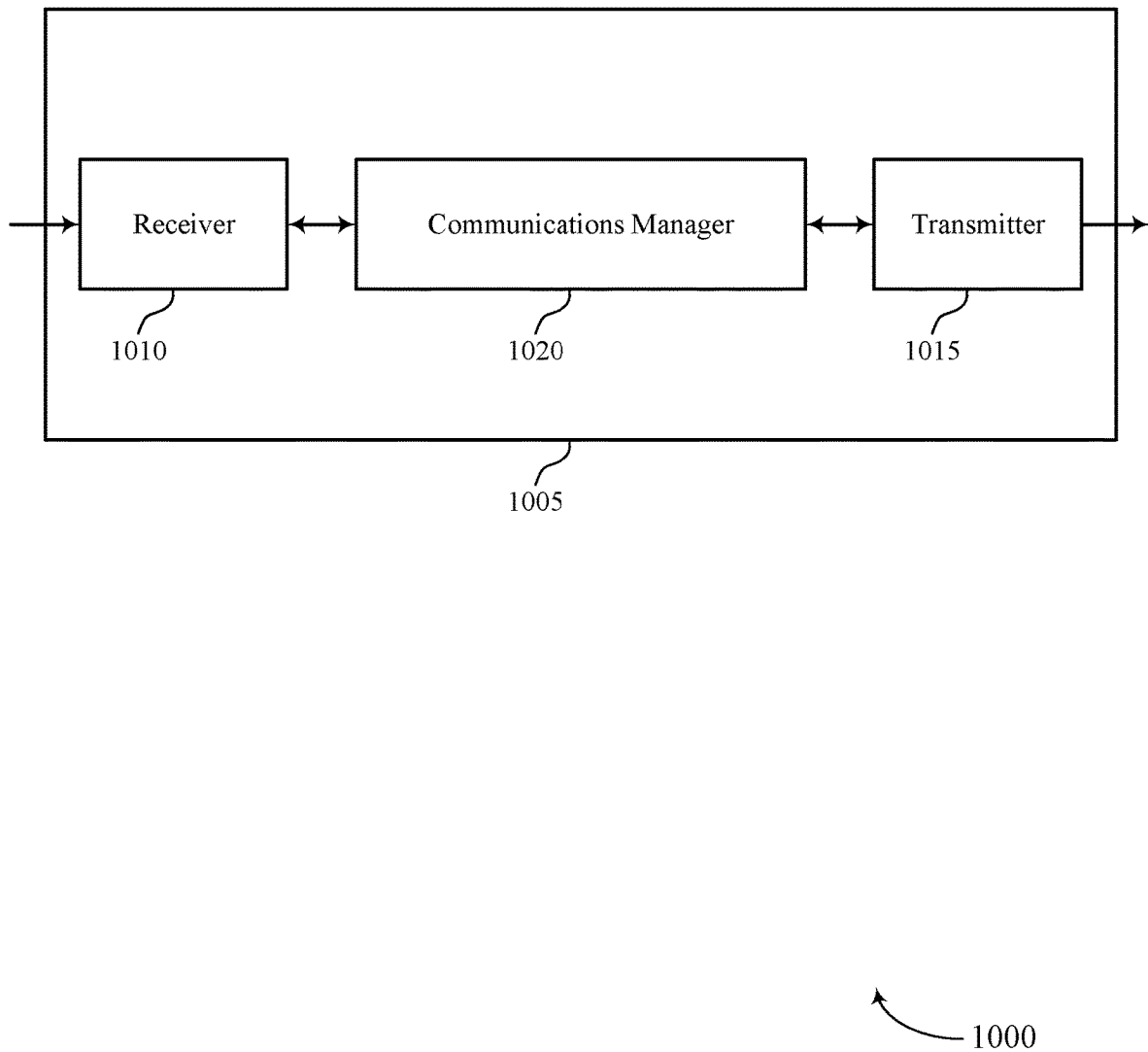
FIGS. 10 and 11 show block diagrams of devices that support techniques for neighbor cell measurement in wireless communications systems in accordance with one or more aspects of the present disclosure.

FIG. 10 shows a block diagram 1000 of a device 1005 that supports techniques for neighbor cell measurement in wireless communications systems in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for neighbor cell measurement in wireless communications systems as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. For example, the communications manager 1020 is capable of, configured to, or operable to support a means for transmitting, to a UE, a request for a report for one or more neighbor cells. The communications manager 1020 is capable of, configured to, or operable to support a means for receiving, from the UE, an indication that a first signal of a first neighbor cell that provides information for the report is an on-demand signal. The communications manager 1020 is capable of, configured to, or operable to support a means for receiving, from the UE, the report that includes information for the first neighbor cell.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for neighbor cell reporting of NES-mode neighbor cells, which may provide for more efficient network management, reduced latency, efficient adaptation of transmission parameters for communications, enhanced system efficiency, and enhanced user experience.

Figure 11:
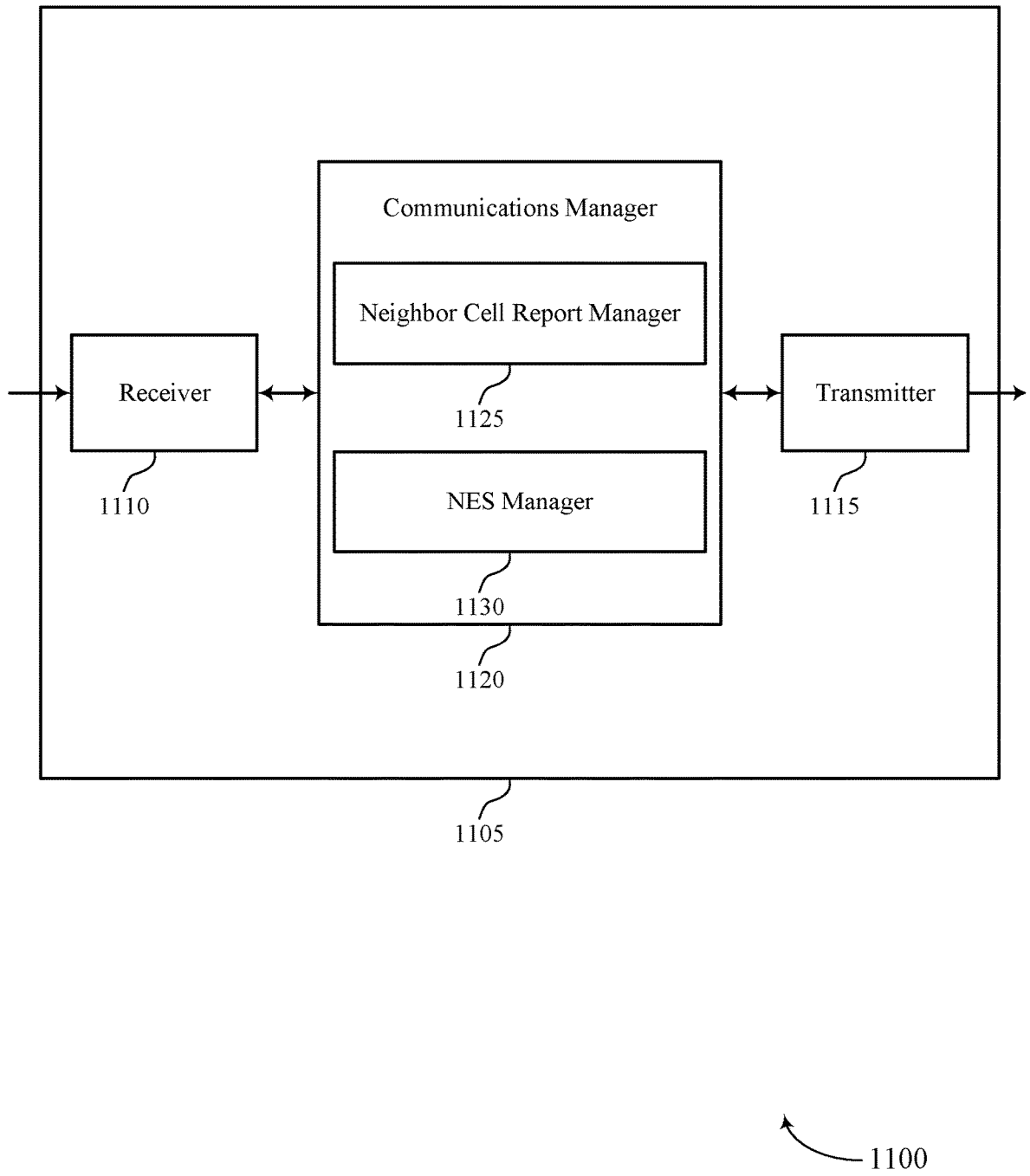

FIG. 11 shows a block diagram 1100 of a device 1105 that supports techniques for neighbor cell measurement in wireless communications systems in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for neighbor cell measurement in wireless communications systems as described herein. For example, the communications manager 1120 may include a neighbor cell report manager 1125 a NES manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. The neighbor cell report manager 1125 is capable of, configured to, or operable to support a means for transmitting, to a UE, a request for a report for one or more neighbor cells. The NES manager 1130 is capable of, configured to, or operable to support a means for receiving, from the UE, an indication that a first signal of a first neighbor cell that provides information for the report is an on-demand signal. The neighbor cell report manager 1125 is capable of, configured to, or operable to support a means for receiving, from the UE, the report that includes information for the first neighbor cell.

Figure 12:
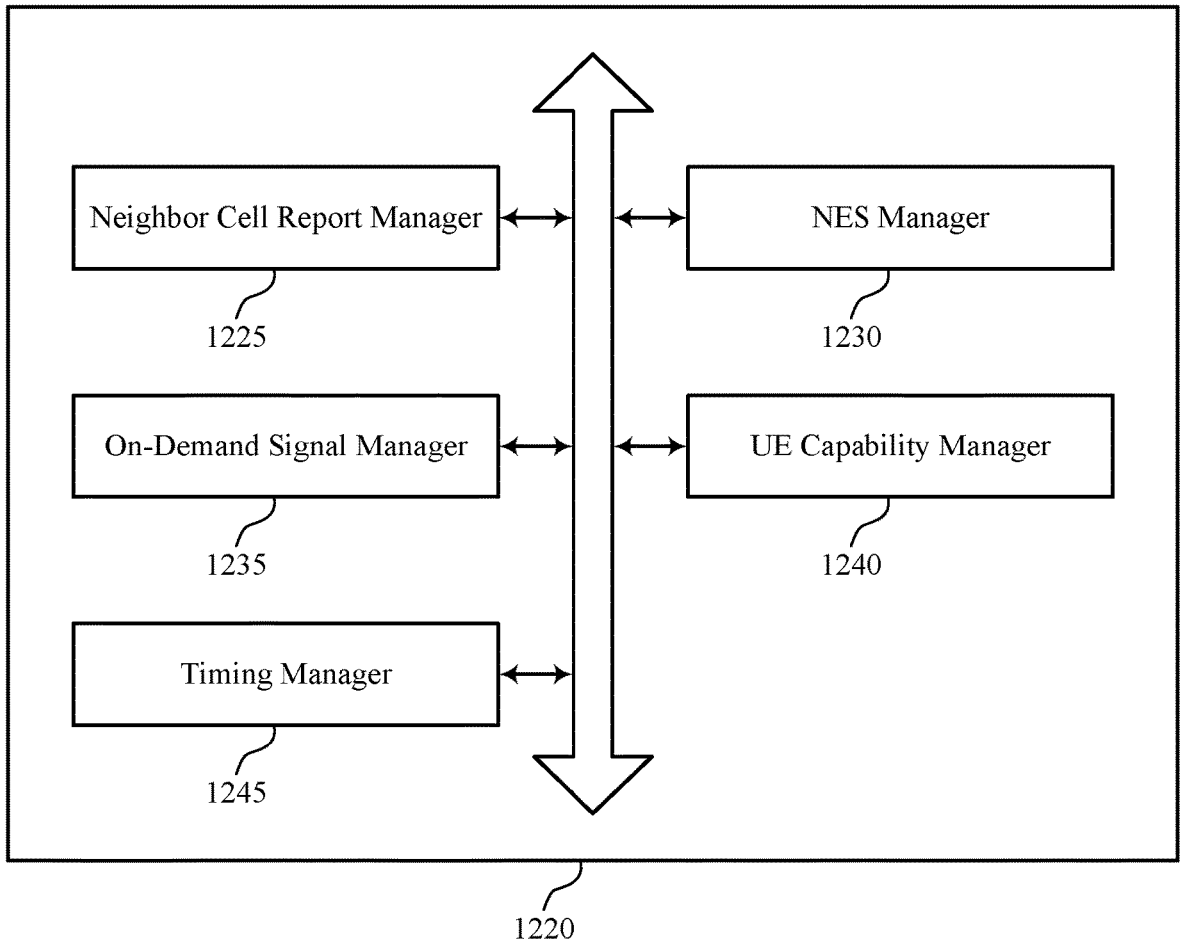
FIG. 12 shows a block diagram of a communications manager that supports techniques for neighbor cell measurement in wireless communications systems in accordance with one or more aspects of the present disclosure.

FIG. 12 shows a block diagram 1200 of a communications manager 1220 that supports techniques for neighbor cell measurement in wireless communications systems in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for neighbor cell measurement in wireless communications systems as described herein. For example, the communications manager 1220 may include a neighbor cell report manager 1225, a NES manager 1230, an on-demand signal manager 1235, a UE capability manager 1240, a timing manager 1245, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication in accordance with examples as disclosed herein. The neighbor cell report manager 1225 is capable of, configured to, or operable to support a means for transmitting, to a UE, a request for a report for one or more neighbor cells. The NES manager 1230 is capable of, configured to, or operable to support a means for receiving, from the UE, an indication that a first signal of a first neighbor cell that provides information for the report is an on-demand signal. In some examples, the neighbor cell report manager 1225 is capable of, configured to, or operable to support a means for receiving, from the UE, the report that includes information for the first neighbor cell.

In some examples, the NES manager 1230 is capable of, configured to, or operable to support a means for configuring the UE to transmit, responsive to the indication that the first signal is an on-demand signal, a transmission request to the first neighbor cell to transmit the on-demand signal. In some examples, to support configuring the UE, the NES manager 1230 is capable of, configured to, or operable to support a means for providing one or more threshold values associated with the first neighbor cell, where the transmission request to the first neighbor cell is transmitted responsive to one or more conditions of the first neighbor cell meeting the one or more threshold values.

In some examples, a cell identification of the first neighbor cell that is included in a list of cells for which the UE is to report a cell global identity (CGI), a list of cells for which the UE is to report a system frame number and frame timing difference (SFTD) measurement, or a separate list of cells provided by the serving cell. In some examples, a reference signal received power (RSRP) associated with the first neighbor cell that exceeds a RSRP threshold value. In some examples, a received signal strength indicator (RSSI) associated with the first neighbor cell that exceeds a RSSI threshold value. In some examples, a signal to noise ratio (SNR) associated with the first neighbor cell that exceeds a SNR threshold value.

In some examples, to support transmitting the request for the report, the neighbor cell report manager 1225 is capable of, configured to, or operable to support a means for transmitting a request for a cell global identity (CGI) report, and where the first signal is a synchronization signal block (SSB) or remaining minimum system information (RMSI) that includes a cell identification of the first neighbor cell. In some examples, the indication from the UE indicates that the on-demand signal of the first neighbor cell is an on-demand system information block.

In some examples, the on-demand signal manager 1235 is capable of, configured to, or operable to support a means for transmitting, to the UE, an indication to request the on-demand system information block of the first neighbor cell, where the report includes information from the on-demand system information block of the first neighbor cell.

In some examples, the UE capability manager 1240 is capable of, configured to, or operable to support a means for receiving a capability indication that the UE is capable of transmitting a demand signal to neighboring cells for reports, and where the report is provided responsive to transmission of the demand signal to the first neighbor cell.

In some examples, to support transmitting the request for the report, the timing manager 1245 is capable of, configured to, or operable to support a means for transmitting a request for a system frame number and frame timing difference (SFTD) measurement report, and where the first signal is a synchronization signal block (SSB) that includes a SSB index or a half-frame index, and the report indicates a timing difference between the SSB of the first neighbor cell and a frame boundary of the serving cell. In some examples, the report indicates one or more measured metrics of a synchronization signal block (SSB) transmitted by the first neighbor cell, where the SSB is a reduced-content SSB that does not include a beam index associated with a beam that is used to transmit the SSB.

Figure 13:
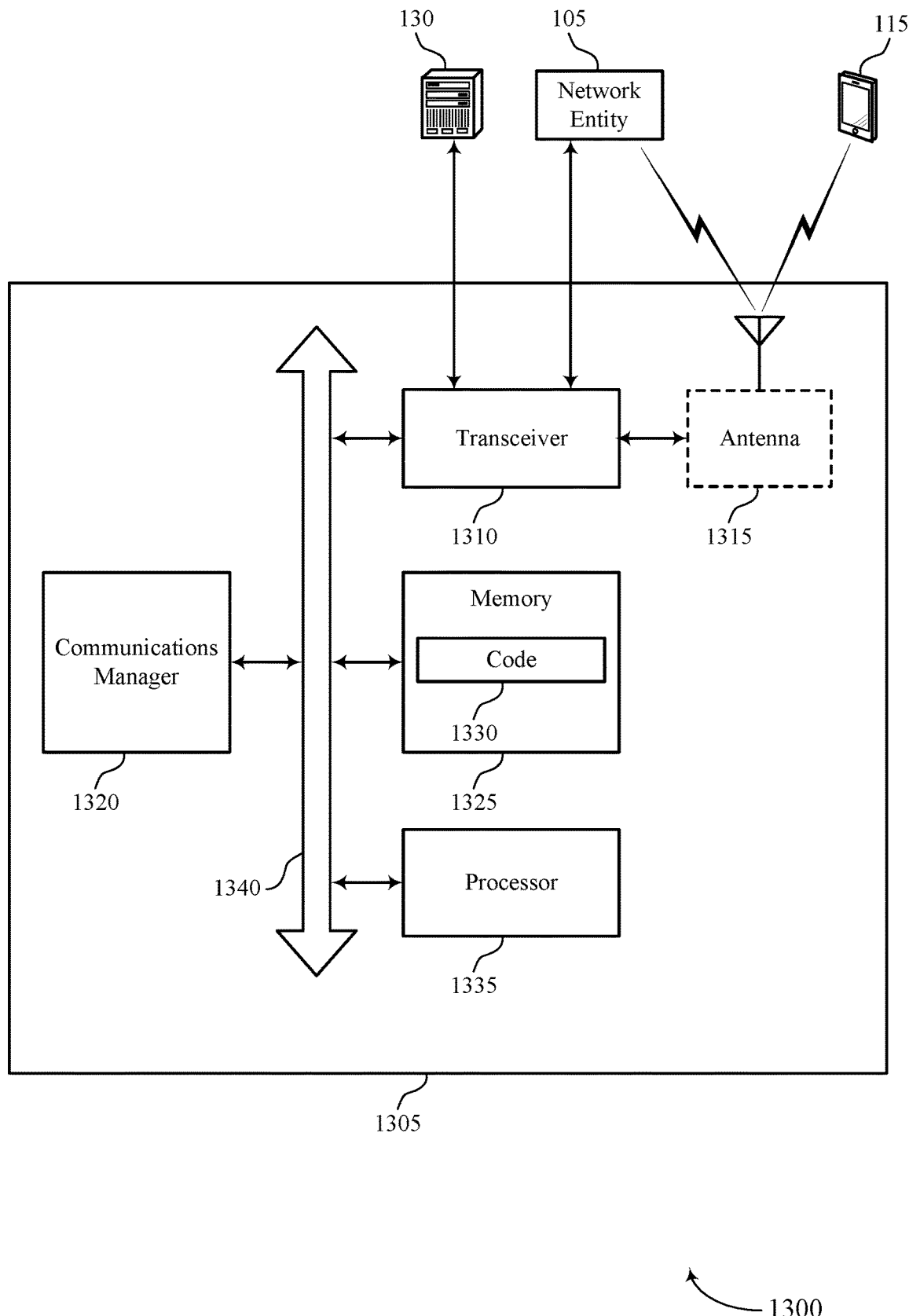
FIG. 13 shows a diagram of a system including a device that supports techniques for neighbor cell measurement in wireless communications systems in accordance with one or more aspects of the present disclosure.

FIG. 13 shows a diagram of a system 1300 including a device 1305 that supports techniques for neighbor cell measurement in wireless communications systems in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for neighbor cell measurement in wireless communications systems). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication in accordance with examples as disclosed herein. For example, the communications manager 1320 is capable of, configured to, or operable to support a means for transmitting, to a UE, a request for a report for one or more neighbor cells. The communications manager 1320 is capable of, configured to, or operable to support a means for receiving, from the UE, an indication that a first signal of a first neighbor cell that provides information for the report is an on-demand signal. The communications manager 1320 is capable of, configured to, or operable to support a means for receiving, from the UE, the report that includes information for the first neighbor cell.

By including or configuring the communications manager 1320 in accordance with examples as described herein, the device 1305 may support techniques for neighbor cell reporting of NES-mode neighbor cells, which may provide for more efficient network management, reduced latency, efficient adaptation of transmission parameters for communications, enhanced system efficiency, and enhanced user experience.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for neighbor cell measurement in wireless communications systems as described herein, or the at least one processor 1335 and the at least one memory 1325 may be otherwise configured to, individually or collectively, perform or support such operations.

Figure 14:
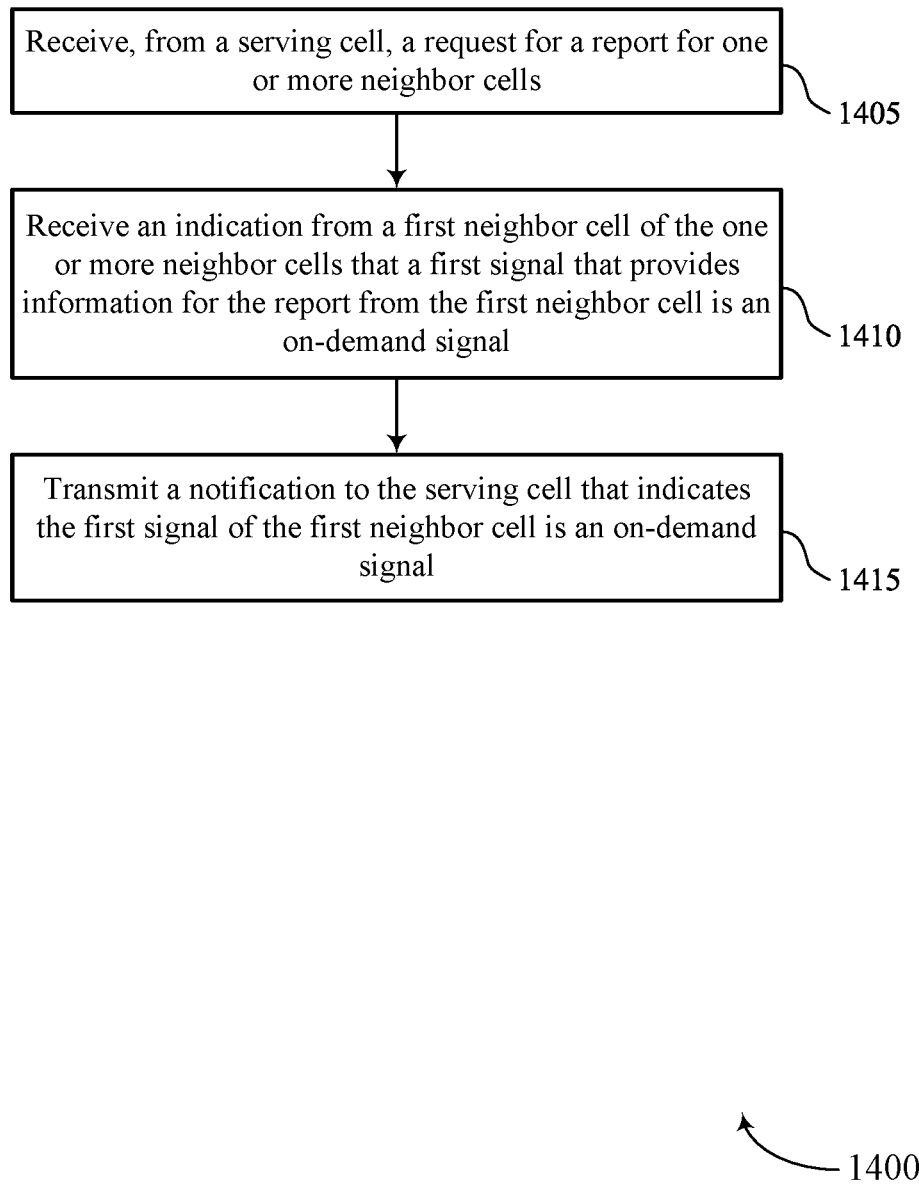
FIGS. 14 through 19 show flowcharts illustrating methods that support techniques for neighbor cell measurement in wireless communications systems in accordance with one or more aspects of the present disclosure.

FIG. 14 shows a flowchart illustrating a method 1400 that supports techniques for neighbor cell measurement in wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a serving cell, a request for a report for one or more neighbor cells. The operations of block 1405 may be performed in accordance with examples as disclosed herein. In some examples, aspects of the operations of 1405 may be performed by a neighbor cell report manager 825 as described with reference to FIG. 8.

At 1410, the method may include receiving an indication from a first neighbor cell of the one or more neighbor cells that a first signal that provides information for the report from the first neighbor cell is an on-demand signal. The operations of block 1410 may be performed in accordance with examples as disclosed herein. In some examples, aspects of the operations of 1410 may be performed by a NES manager 830 as described with reference to FIG. 8.

At 1415, the method may include transmitting a notification to the serving cell that indicates the first signal of the first neighbor cell is an on-demand signal. The operations of block 1415 may be performed in accordance with examples as disclosed herein. In some examples, aspects of the operations of 1415 may be performed by an on-demand signal manager 835 as described with reference to FIG. 8.

Figure 15:
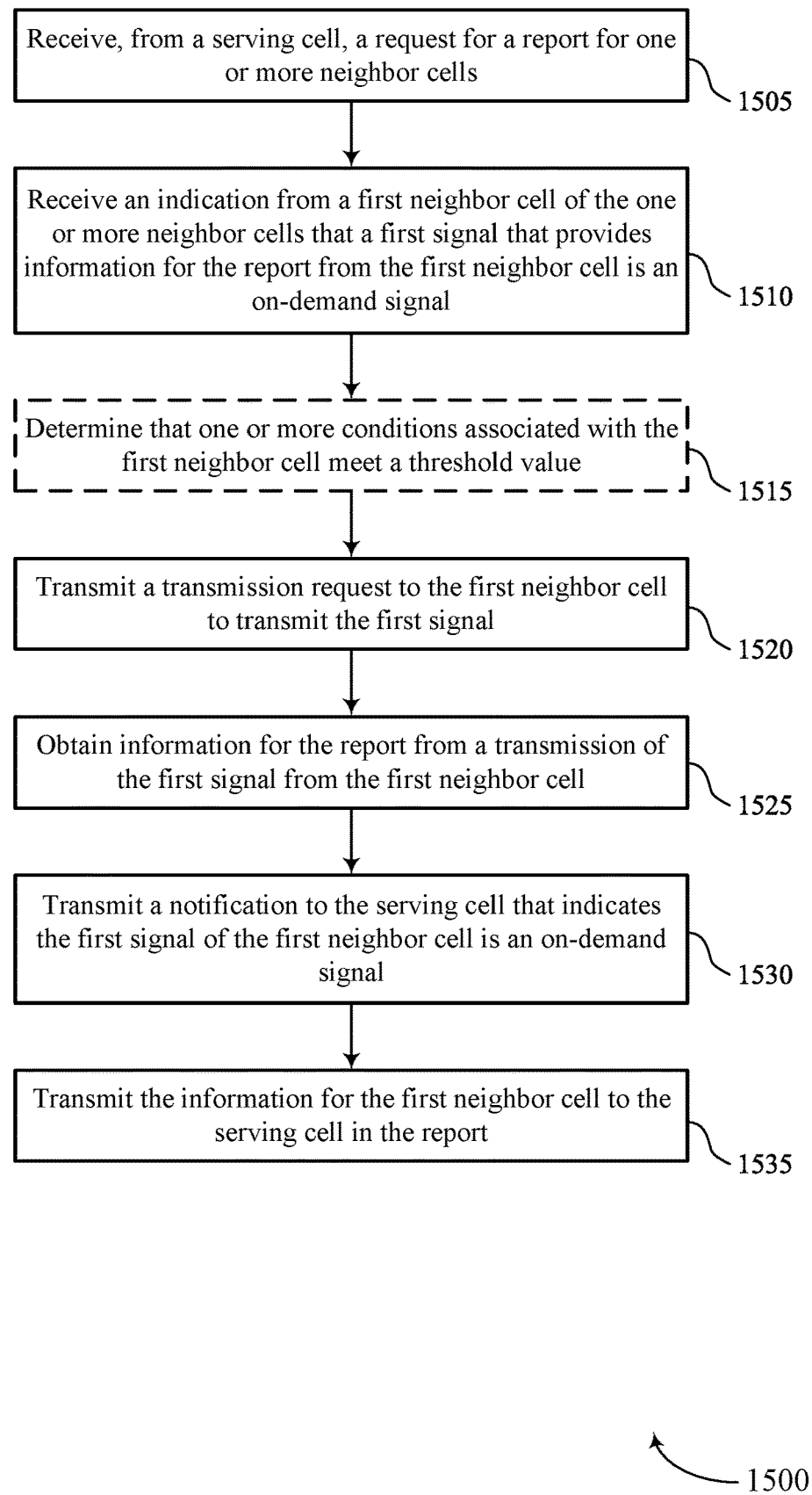

FIG. 15 shows a flowchart illustrating a method 1500 that supports techniques for neighbor cell measurement in wireless communications systems in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a serving cell, a request for a report for one or more neighbor cells. The operations of block 1505 may be performed in accordance with examples as disclosed herein. In some examples, aspects of the operations of 1505 may be performed by a neighbor cell report manager 825 as described with reference to FIG. 8.

At 1510, the method may include receiving an indication from a first neighbor cell of the one or more neighbor cells that a first signal that provides information for the report from the first neighbor cell is an on-demand signal. The operations of block 1510 may be performed in accordance with examples as disclosed herein. In some examples, aspects of the operations of 1510 may be performed by a NES manager 830 as described with reference to FIG. 8.

At 1515, optionally, the method may include determining that one or more conditions associated with the first neighbor cell meet a threshold value. The operations of block 1515 may be performed in accordance with examples as disclosed herein. In some examples, aspects of the operations of 1515 may be performed by a NES manager 830 as described with reference to FIG. 8. In some cases, the one or more conditions may include one or more of: a cell identification of the first neighbor cell that being included in a list of cells for which the UE is to report a CGI, a list of cells for which the UE is to report a SFTD measurement, a separate list of cells provided by the serving cell, a RSRP associated with the first neighbor cell that exceeds a RSRP threshold value, a RSSI associated with the first neighbor cell that exceeds a RSSI threshold value, or a SNR associated with the first neighbor cell that exceeds a SNR threshold value.

At 1520, the method may include transmitting a transmission request to the first neighbor cell to transmit the first signal. The operations of block 1520 may be performed in accordance with examples as disclosed herein. In some examples, aspects of the operations of 1520 may be performed by a NES manager 830 as described with reference to FIG. 8.

At 1525, the method may include obtaining information for the report from a transmission of the first signal from the first neighbor cell. The operations of block 1525 may be performed in accordance with examples as disclosed herein. In some examples, aspects of the operations of 1525 may be performed by a neighbor cell report manager 825 as described with reference to FIG. 8.

At 1530, the method may include transmitting a notification to the serving cell that indicates the first signal of the first neighbor cell is an on-demand signal. The operations of block 1530 may be performed in accordance with examples as disclosed herein. In some examples, aspects of the operations of 1530 may be performed by an on-demand signal manager 835 as described with reference to FIG. 8.

At 1535, the method may include transmitting the information for the first neighbor cell to the serving cell in the report. The operations of block 1535 may be performed in accordance with examples as disclosed herein. In some examples, aspects of the operations of 1535 may be performed by a neighbor cell report manager 825 as described with reference to FIG. 8.

Figure 16:
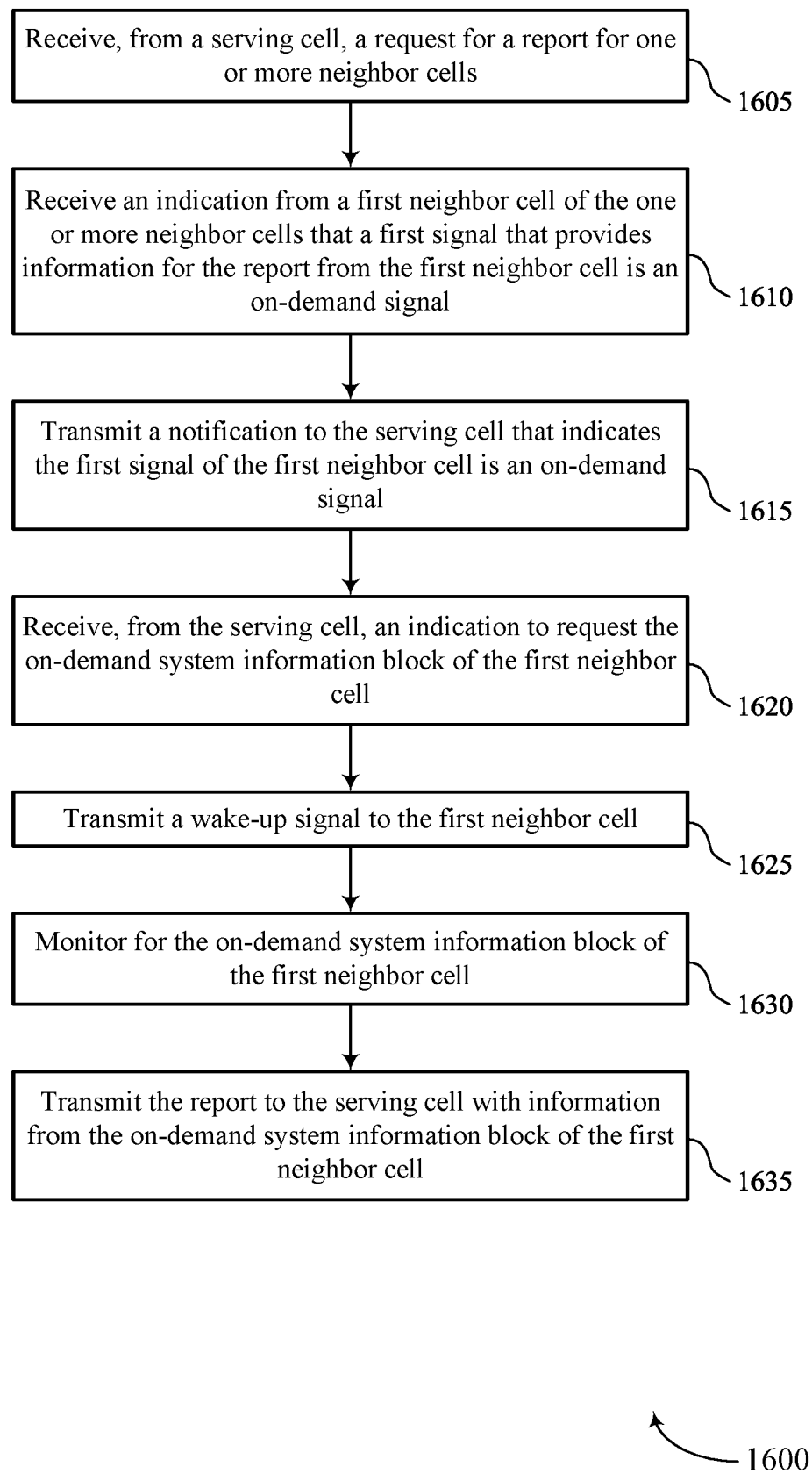

FIG. 16 shows a flowchart illustrating a method 1600 that supports techniques for neighbor cell measurement in wireless communications systems in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from a serving cell, a request for a report for one or more neighbor cells. The operations of block 1605 may be performed in accordance with examples as disclosed herein. In some examples, aspects of the operations of 1605 may be performed by a neighbor cell report manager 825 as described with reference to FIG. 8.

At 1610, the method may include receiving an indication from a first neighbor cell of the one or more neighbor cells that a first signal that provides information for the report from the first neighbor cell is an on-demand signal. The operations of block 1610 may be performed in accordance with examples as disclosed herein. In some examples, aspects of the operations of 1610 may be performed by a NES manager 830 as described with reference to FIG. 8.

At 1615, the method may include transmitting a notification to the serving cell that indicates the first signal of the first neighbor cell is an on-demand signal. The operations of block 1615 may be performed in accordance with examples as disclosed herein. In some examples, aspects of the operations of 1615 may be performed by an on-demand signal manager 835 as described with reference to FIG. 8.

At 1620, the method may include receiving, from the serving cell, an indication to request the on-demand system information block of the first neighbor cell. The operations of block 1620 may be performed in accordance with examples as disclosed herein. In some examples, aspects of the operations of 1620 may be performed by an on-demand signal manager 835 as described with reference to FIG. 8.

At 1625, the method may include transmitting a wake-up signal to the first neighbor cell. The operations of block 1625 may be performed in accordance with examples as disclosed herein. In some examples, aspects of the operations of 1625 may be performed by a NES manager 830 as described with reference to FIG. 8.

At 1630, the method may include monitoring for the on-demand system information block of the first neighbor cell. The operations of block 1630 may be performed in accordance with examples as disclosed herein. In some examples, aspects of the operations of 1630 may be performed by a system information monitoring manager 845 as described with reference to FIG. 8.

At 1635, the method may include transmitting the report to the serving cell with information from the on-demand system information block of the first neighbor cell. The operations of block 1635 may be performed in accordance with examples as disclosed herein. In some examples, aspects of the operations of 1635 may be performed by a neighbor cell report manager 825 as described with reference to FIG. 8.

Figure 17:
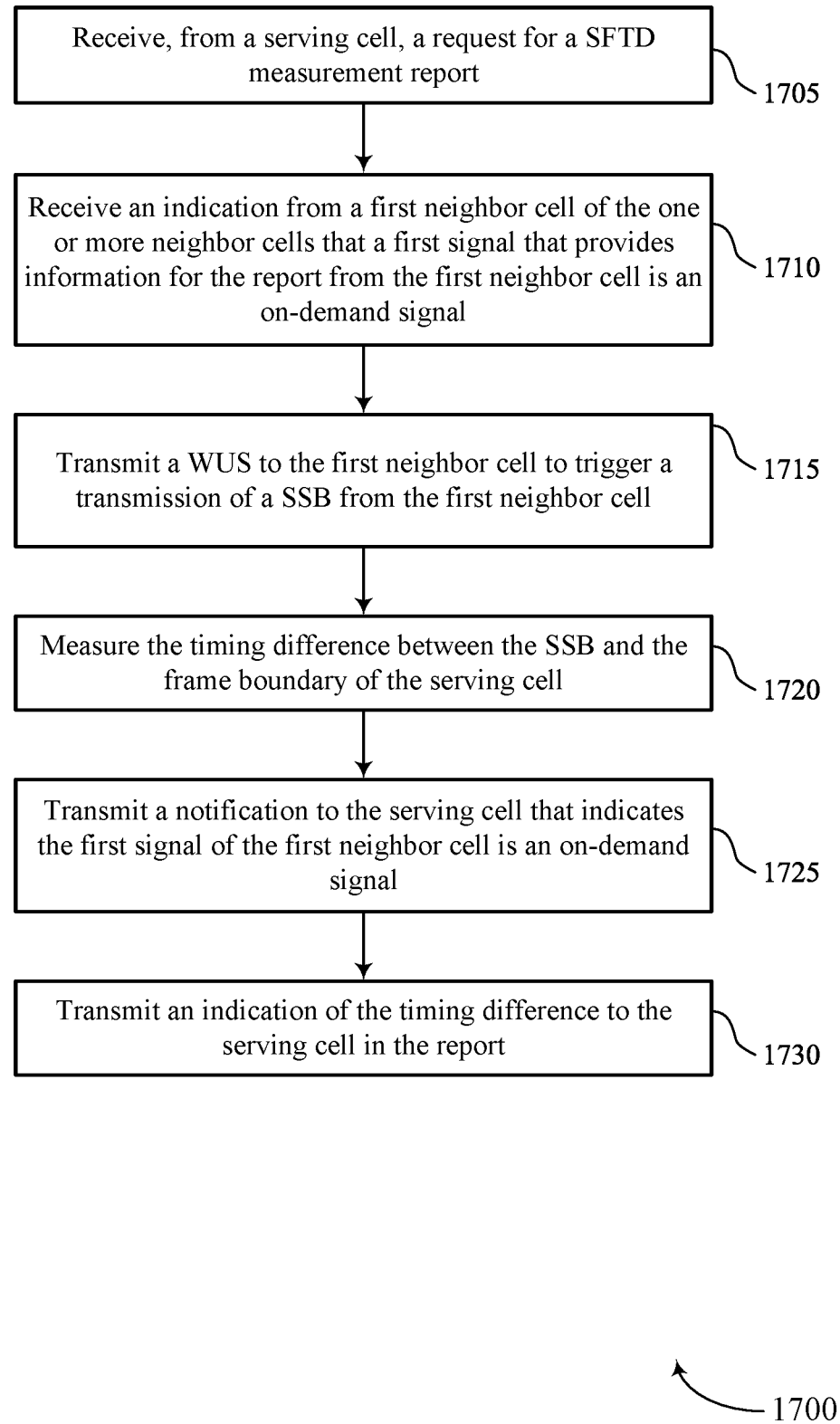

FIG. 17 shows a flowchart illustrating a method 1700 that supports techniques for neighbor cell measurement in wireless communications systems in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving, from a serving cell, a request for a system frame number and frame timing difference (SFTD) measurement report, and where the first signal is a synchronization signal block (SSB) that includes a SSB index or a half-frame index, and the report indicates a timing difference between the SSB and a frame boundary of the serving cell. The operations of block 1705 may be performed in accordance with examples as disclosed herein. In some examples, aspects of the operations of 1705 may be performed by a neighbor cell report manager 825 as described with reference to FIG. 8.

At 1710, the method may include receiving an indication from a first neighbor cell of the one or more neighbor cells that a first signal that provides information for the report from the first neighbor cell is an on-demand signal. The operations of block 1710 may be performed in accordance with examples as disclosed herein. In some examples, aspects of the operations of 1710 may be performed by a NES manager 830 as described with reference to FIG. 8.

At 1715, the method may include transmitting a WUS to the first neighbor cell to trigger a transmission of a SSB from the first neighbor cell. The operations of block 1715 may be performed in accordance with examples as disclosed herein. In some examples, aspects of the operations of 1715 may be performed by a NES manager 830 as described with reference to FIG. 8.

At 1720, the method may include measuring the timing difference between the SSB and the frame boundary of the serving cell. The operations of block 1720 may be performed in accordance with examples as disclosed herein. In some examples, aspects of the operations of 1720 may be performed by a timing manager 850 as described with reference to FIG. 8.

At 1725, the method may include transmitting a notification to the serving cell that indicates the first signal of the first neighbor cell is an on-demand signal. The operations of block 1725 may be performed in accordance with examples as disclosed herein. In some examples, aspects of the operations of 1725 may be performed by an on-demand signal manager 835 as described with reference to FIG. 8.

At 1730, the method may include transmitting an indication of the timing difference to the serving cell in the report. The operations of block 1730 may be performed in accordance with examples as disclosed herein. In some examples, aspects of the operations of 1730 may be performed by a neighbor cell report manager 825 as described with reference to FIG. 8.

Figure 18:
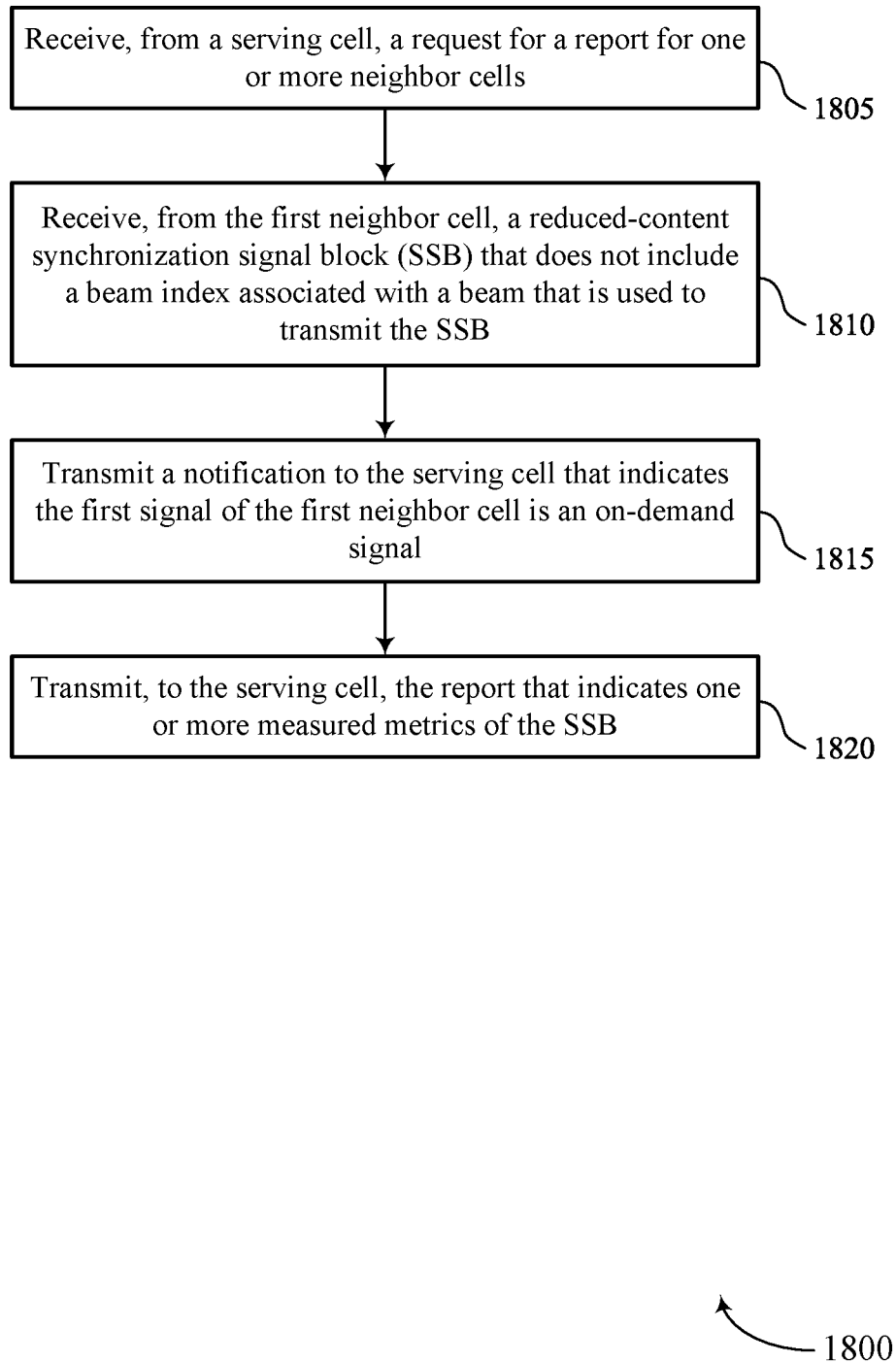

FIG. 18 shows a flowchart illustrating a method 1800 that supports techniques for neighbor cell measurement in wireless communications systems in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving, from a serving cell, a request for a report for one or more neighbor cells. The operations of block 1805 may be performed in accordance with examples as disclosed herein. In some examples, aspects of the operations of 1805 may be performed by a neighbor cell report manager 825 as described with reference to FIG. 8.

At 1810, the method may include receiving, from the first neighbor cell, a reduced-content synchronization signal block (SSB) that does not include a beam index associated with a beam that is used to transmit the SSB. The operations of block 1810 may be performed in accordance with examples as disclosed herein. In some examples, aspects of the operations of 1810 may be performed by a system information monitoring manager 845 as described with reference to FIG. 8.

At 1815, the method may include transmitting a notification to the serving cell that indicates the first signal of the first neighbor cell is an on-demand signal. The operations of block 1815 may be performed in accordance with examples as disclosed herein. In some examples, aspects of the operations of 1815 may be performed by an on-demand signal manager 835 as described with reference to FIG. 8.

At 1820, the method may include transmitting, to the serving cell, the report that indicates one or more measured metrics of the SSB. The operations of block 1820 may be performed in accordance with examples as disclosed herein. In some examples, aspects of the operations of 1820 may be performed by a neighbor cell report manager 825 as described with reference to FIG. 8.

Figure 19:
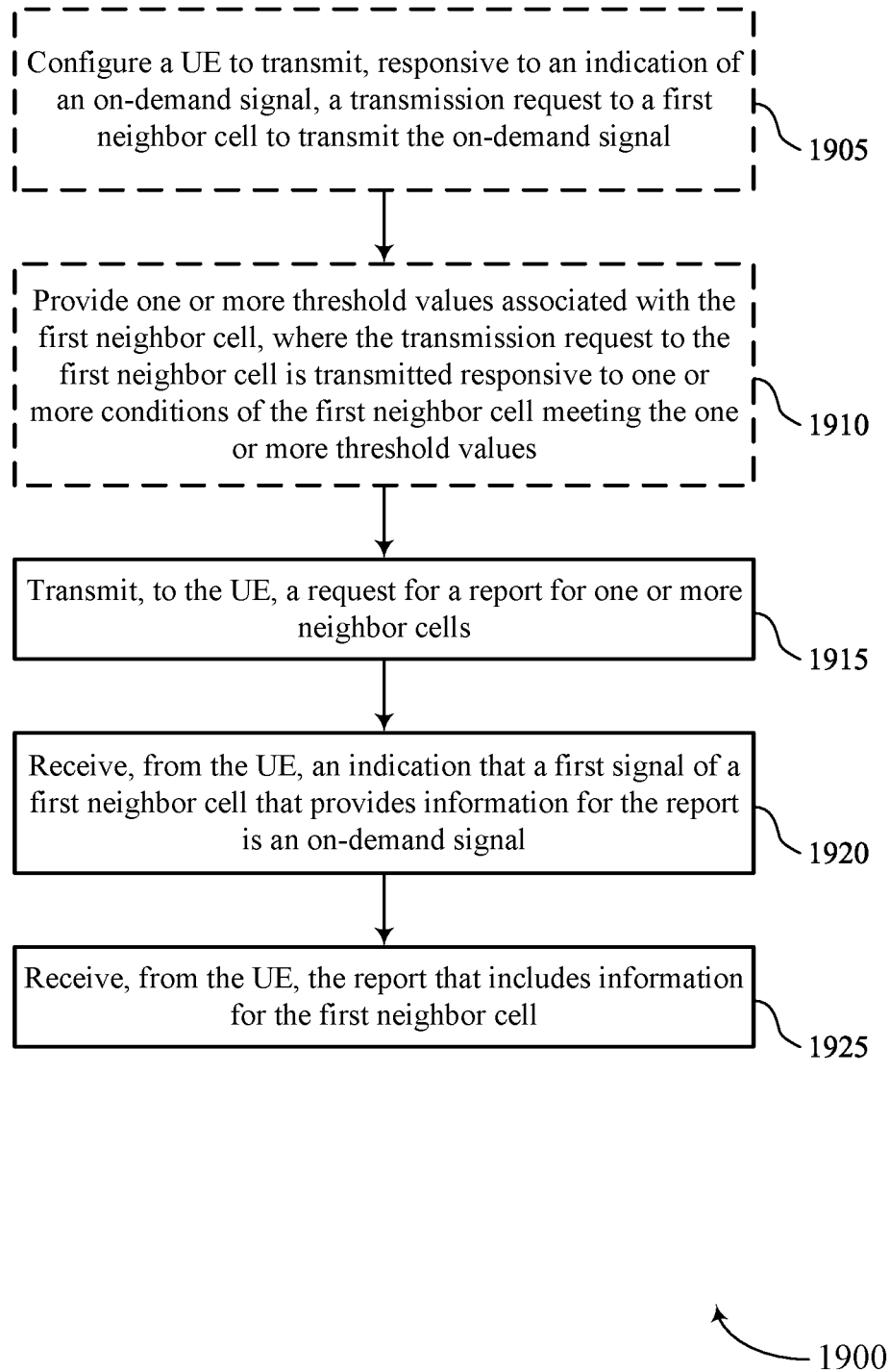

FIG. 19 shows a flowchart illustrating a method 1900 that supports techniques for neighbor cell measurement in wireless communications systems in accordance with aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, optionally, the method may include configuring a UE to transmit, responsive to an indication of an on-demand signal, a transmission request to a first neighbor cell to transmit the on-demand signal. The operations of block 1905 may be performed in accordance with examples as disclosed herein. In some examples, aspects of the operations of 1905 may be performed by a NES manager 1230 as described with reference to FIG. 12.

At 1910, optionally, the method may include providing one or more threshold values associated with the first neighbor cell, where the transmission request to the first neighbor cell is transmitted responsive to one or more conditions of the first neighbor cell meeting the one or more threshold values. The operations of block 1910 may be performed in accordance with examples as disclosed herein. In some examples, aspects of the operations of 1910 may be performed by a NES manager 1230 as described with reference to FIG. 12.

At 1915, the method may include transmitting, to the UE, a request for a report for one or more neighbor cells. The operations of block 1915 may be performed in accordance with examples as disclosed herein. In some examples, aspects of the operations of 1915 may be performed by a neighbor cell report manager 1225 as described with reference to FIG. 12.

At 1920, the method may include receiving, from the UE, an indication that a first signal of a first neighbor cell that provides information for the report is an on-demand signal. The operations of block 1920 may be performed in accordance with examples as disclosed herein. In some examples, aspects of the operations of 1920 may be performed by a NES manager 1230 as described with reference to FIG. 12.

At 1925, the method may include receiving, from the UE, the report that includes information for the first neighbor cell. The operations of block 1925 may be performed in accordance with examples as disclosed herein. In some examples, aspects of the operations of 1925 may be performed by a neighbor cell report manager 1225 as described with reference to FIG. 12.

The following provides an overview of aspects of the present disclosure:

Aspect 1: A method for wireless communication at a UE, comprising: receiving, from a serving cell, a request for a report for one or more neighbor cells; receiving an indication from a first neighbor cell of the one or more neighbor cells that a first signal that provides information for the report from the first neighbor cell is an on-demand signal; and transmitting a notification to the serving cell that indicates the first signal of the first neighbor cell is an on-demand signal.

Aspect 2: The method of aspect 1, further comprising: transmitting, responsive to the indication that the first signal is an on-demand signal, a transmission request to the first neighbor cell to transmit the first signal; obtaining information for the report from a transmission of the first signal from the first neighbor cell; and transmitting the information for the first neighbor cell to the serving cell in the report.

Aspect 3: The method of any of aspects 1 through 2, further comprising: determining that one or more conditions associated with the first neighbor cell meet a threshold value; and transmitting a transmission request to the first neighbor cell to transmit the first signal.

Aspect 4: The method of aspect 3, wherein the one or more conditions comprise one or more of a cell identification of the first neighbor cell that is included in a list of cells for which the UE is to report a cell global identity (CGI), a list of cells for which the UE is to report a system frame number and frame timing difference (SFTD) measurement, or a separate list of cells provided by the serving cell, a reference signal received power (RSRP) associated with the first neighbor cell that exceeds a RSRP threshold value, a received signal strength indicator (RSSI) associated with the first neighbor cell that exceeds a RSSI threshold value, or a signal to noise ratio (SNR) associated with the first neighbor cell that exceeds a SNR threshold value.

Aspect 5: The method of any of aspects 1 through 4, wherein the receiving the request for the report comprises: receiving, from the serving cell, a request for a cell global identity (CGI) report, and wherein the first signal is a synchronization signal block (SSB) or remaining minimum system information (RMSI) that includes a cell identification of the first neighbor cell.

Aspect 6: The method of any of aspects 1 through 5, wherein the notification to the serving cell is an indication that the on-demand signal of the first neighbor cell is an on-demand system information block.

Aspect 7: The method of aspect 6, further comprising: receiving, from the serving cell, an indication to request the on-demand system information block of the first neighbor cell; transmitting a wake-up signal to the first neighbor cell; monitoring for the on-demand system information block of the first neighbor cell; and transmitting the report to the serving cell with information from the on-demand system information block of the first neighbor cell.

Aspect 8: The method of any of aspects 1 through 7, further comprising: transmitting a capability indication that the UE is capable of transmitting a demand signal to neighboring cells for reports.

Aspect 9: The method of any of aspects 1 through 8, wherein the receiving the request for the report comprises: receiving, from the serving cell, a request for a system frame number and frame timing difference (SFTD) measurement report, and wherein the first signal is a synchronization signal block (SSB) that includes a SSB index or a half-frame index, and the report indicates a timing difference between the SSB and a frame boundary of the serving cell.

Aspect 10: The method of aspect 9, further comprising: transmitting a wake-up signal (WUS) to the first neighbor cell to trigger a transmission of a SSB from the first neighbor cell; measuring the timing difference between the SSB and the frame boundary of the serving cell; and transmitting an indication of the timing difference to the serving cell in the report.

Aspect 11: The method of any of aspects 1 through 10, further comprising: receiving, from the first neighbor cell, a reduced-content synchronization signal block (SSB) that does not include a beam index associated with a beam that is used to transmit the SSB; and transmitting the report that indicates a timing of the SSB to the serving cell.

Aspect 12: The method of aspect 11, wherein the timing of the SSB indicates one or more of a system frame number associated with the SSB, a slot index associated with the SSB, a symbol index associated with the SSB, a timing within a search window of receipt of the SSB, or a SSB index of as associated SSB of the serving cell that is received closest in time to the SSB of the first neighbor cell.

Aspect 13: The method of any of aspects 1 through 12, further comprising: receiving, from the first neighbor cell, a reduced-content synchronization signal block (SSB) that does not include a beam index associated with a beam that is used to transmit the SSB; and transmitting, to the serving cell, the report that indicates one or more measured metrics of the SSB.

Aspect 14: A method for wireless communication at a serving cell, comprising: transmitting, to a UE, a request for a report for one or more neighbor cells; receiving, from the UE, an indication that a first signal of a first neighbor cell that provides information for the report is an on-demand signal; and receiving, from the UE, the report that includes information for the first neighbor cell.

Aspect 15: The method of aspect 14, further comprising: configuring the UE to transmit, responsive to the indication that the first signal is an on-demand signal, a transmission request to the first neighbor cell to transmit the on-demand signal.

Aspect 16: The method of aspect 15, wherein the configuring the UE comprises: providing one or more threshold values associated with the first neighbor cell, wherein the transmission request to the first neighbor cell is transmitted responsive to one or more conditions of the first neighbor cell meeting the one or more threshold values.

Aspect 17: The method of aspect 16, wherein the one or more conditions comprise one or more of a cell identification of the first neighbor cell that is included in a list of cells for which the UE is to report a cell global identity (CGI), a list of cells for which the UE is to report a system frame number and frame timing difference (SFTD) measurement, or a separate list of cells provided by the serving cell, a reference signal received power (RSRP) associated with the first neighbor cell that exceeds a RSRP threshold value, a received signal strength indicator (RSSI) associated with the first neighbor cell that exceeds a RSSI threshold value, or a signal to noise ratio (SNR) associated with the first neighbor cell that exceeds a SNR threshold value.

Aspect 18: The method of any of aspects 14 through 17, wherein the transmitting the request for the report comprises: transmitting a request for a cell global identity (CGI) report, and wherein the first signal is a synchronization signal block (SSB) or remaining minimum system information (RMSI) that includes a cell identification of the first neighbor cell.

Aspect 19: The method of any of aspects 14 through 18, wherein the indication from the UE indicates that the on-demand signal of the first neighbor cell is an on-demand system information block.

Aspect 20: The method of aspect 19, further comprising: transmitting, to the UE, an indication to request the on-demand system information block of the first neighbor cell, wherein the report includes information from the on-demand system information block of the first neighbor cell.

Aspect 21: The method of any of aspects 14 through 20, further comprising: receiving a capability indication that the UE is capable of transmitting a demand signal to neighboring cells for reports, and wherein the report is provided responsive to transmission of the demand signal to the first neighbor cell.

Aspect 22: The method of any of aspects 14 through 21, wherein the transmitting the request for the report comprises: transmitting a request for a system frame number and frame timing difference (SFTD) measurement report, and wherein the first signal is a synchronization signal block (SSB) that includes a SSB index or a half-frame index, and the report indicates a timing difference between the SSB of the first neighbor cell and a frame boundary of the serving cell.

Aspect 23: The method of any of aspects 14 through 22, wherein the report indicates one or more measured metrics of a synchronization signal block (SSB) transmitted by the first neighbor cell, wherein the SSB is a reduced-content SSB that does not include a beam index associated with a beam that is used to transmit the SSB.

Aspect 24: A UE for wireless communication, comprising one or more memories storing processor-executable code, and one or more processors coupled with the one or more memories and individually or collectively operable to execute the code to cause the UE to perform a method of any of aspects 1 through 13.

Aspect 25: A UE for wireless communication, comprising at least one means for performing a method of any of aspects 1 through 13.

Aspect 26: A non-transitory computer-readable medium storing code for wireless communication, the code comprising instructions executable by a processor to perform a method of any of aspects 1 through 13.

Aspect 27: A serving cell for wireless communication, comprising one or more memories storing processor-executable code, and one or more processors coupled with the one or more memories and individually or collectively operable to execute the code to cause the serving cell to perform a method of any of aspects 14 through 23.

Aspect 28: A serving cell for wireless communication, comprising at least one means for performing a method of any of aspects 14 through 23.

Aspect 29: A non-transitory computer-readable medium storing code for wireless communication, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a serving cell, a request for a report for one or more neighbor cells;
receive an indication from a first neighbor cell of the one or more neighbor cells that a first signal that provides information for the report from the first neighbor cell is an on-demand signal; and
transmit a notification to the serving cell that indicates the first signal of the first neighbor cell is an on-demand signal.

2. The UE of claim 1, wherein the one or more processors are individually or collectively further operable to execute the code to cause the UE to:
transmit, responsive to the indication that the first signal is an on-demand signal, a transmission request to the first neighbor cell to transmit the first signal;
obtain information for the report from a transmission of the first signal from the first neighbor cell; and
transmit the information for the first neighbor cell to the serving cell in the report.

3. The UE of claim 1, wherein the one or more processors are individually or collectively further operable to execute the code to cause the UE to:
determine that one or more conditions associated with the first neighbor cell meet a threshold value; and
transmit a transmission request to the first neighbor cell to transmit the first signal.

4. The UE of claim 3, wherein:
a cell identification of the first neighbor cell that is included in a list of cells for which the UE is to report a cell global identity (CGI), a list of cells for which the UE is to report a system frame number and frame timing difference (SFTD) measurement, or a separate list of cells provided by the serving cell,
a reference signal received power (RSRP) associated with the first neighbor cell that exceeds a RSRP threshold value,
a received signal strength indicator (RSSI) associated with the first neighbor cell that exceeds a RSSI threshold value, or
a signal to noise ratio (SNR) associated with the first neighbor cell that exceeds a SNR threshold value.

5. The UE of claim 1, wherein, to receive the request for the report, the one or more processors are individually or collectively operable to execute the code to cause the UE to:
receive, from the serving cell, a request for a cell global identity (CGI) report, and wherein the first signal is a synchronization signal block (SSB) or remaining minimum system information (RMSI) that includes a cell identification of the first neighbor cell.

6. The UE of claim 1, wherein the notification to the serving cell is an indication that the on-demand signal of the first neighbor cell is an on-demand system information block.

7. The UE of claim 6, wherein the one or more processors are individually or collectively further operable to execute the code to cause the UE to:
receive, from the serving cell, an indication to request the on-demand system information block of the first neighbor cell;
transmit a wake-up signal to the first neighbor cell;
monitor for the on-demand system information block of the first neighbor cell; and transmit the report to the serving cell with information from the on-demand system information block of the first neighbor cell.

8. The UE of claim 1, wherein the one or more processors are individually or collectively further operable to execute the code to cause the UE to:
 transmit a capability indication that the UE is capable of transmitting a demand signal to neighboring cells for reports.

9. The UE of claim 1, wherein, to receive the request for the report, the one or more processors are individually or collectively operable to execute the code to cause the UE to:
 receive, from the serving cell, a request for a system frame number and frame timing difference (SFTD) measurement report, and wherein the first signal is a synchronization signal block (SSB) that includes a SSB index or a half-frame index, and the report indicates a timing difference between the SSB and a frame boundary of the serving cell.

10. The UE of claim 9, wherein the one or more processors are individually or collectively further operable to execute the code to cause the UE to:
 transmit a wake-up signal (WUS) to the first neighbor cell to trigger a transmission of a SSB from the first neighbor cell;
 measure the timing difference between the SSB and the frame boundary of the serving cell; and
 transmit an indication of the timing difference to the serving cell in the report.

11. The UE of claim 1, wherein the one or more processors are individually or collectively further operable to execute the code to cause the UE to:
 receive, from the first neighbor cell, a reduced-content synchronization signal block (SSB) that does not include a beam index associated with a beam that is used to transmit the SSB; and
 transmit the report that indicates a timing of the SSB to the serving cell.

12. The UE of claim 11, wherein the timing of the SSB indicates one or more of a system frame number associated with the SSB, a slot index associated with the SSB, a symbol index associated with the SSB, a timing within a search window of receipt of the SSB, or a SSB index of as associated SSB of the serving cell that is received closest in time to the SSB of the first neighbor cell.

13. The UE of claim 1, wherein the one or more processors are individually or collectively further operable to execute the code to cause the UE to:
 receive, from the first neighbor cell, a reduced-content synchronization signal block (SSB) that does not include a beam index associated with a beam that is used to transmit the SSB; and
 transmit, to the serving cell, the report that indicates one or more measured metrics of the SSB.

14. A serving cell, comprising:
 one or more memories storing processor-executable code; and
 one or more processors coupled with the one or more memories and individually or collectively operable to execute the code to cause the serving cell to:
  transmit, to a user equipment (UE), a request for a report for one or more neighbor cells;
  receive, from the UE, an indication that a first signal of a first neighbor cell that provides information for the report is an on-demand signal; and
  receive, from the UE, the report that includes information for the first neighbor cell.

15. The serving cell of claim 14, wherein the one or more processors are individually or collectively further operable to execute the code to cause the serving cell to:
 configure the UE to transmit, responsive to the indication that the first signal is an on-demand signal, a transmission request to the first neighbor cell to transmit the on-demand signal.

16. The serving cell of claim 15, wherein, to configure the UE, the one or more processors are individually or collectively operable to execute the code to cause the serving cell to:
 provide one or more threshold values associated with the first neighbor cell, wherein the transmission request to the first neighbor cell is transmitted responsive to one or more conditions of the first neighbor cell meeting the one or more threshold values.

17. The serving cell of claim 16, wherein:
 a cell identification of the first neighbor cell that is included in a list of cells for which the UE is to report a cell global identity (CGI), a list of cells for which the UE is to report a system frame number and frame timing difference (SFTD) measurement, or a separate list of cells provided by the serving cell,
 a reference signal received power (RSRP) associated with the first neighbor cell that exceeds a RSRP threshold value,
 a received signal strength indicator (RSSI) associated with the first neighbor cell that exceeds a RSSI threshold value, or
 a signal to noise ratio (SNR) associated with the first neighbor cell that exceeds a SNR threshold value.

18. The serving cell of claim 14, wherein, to transmit the request for the report, the one or more processors are individually or collectively operable to execute the code to cause the serving cell to:
 transmit a request for a cell global identity (CGI) report, and wherein the first signal is a synchronization signal block (SSB) or remaining minimum system information (RMSI) that includes a cell identification of the first neighbor cell.

19. The serving cell of claim 14, wherein the indication from the UE indicates that the on-demand signal of the first neighbor cell is an on-demand system information block.

20. The serving cell of claim 19, wherein the one or more processors are individually or collectively further operable to execute the code to cause the serving cell to:
 transmit, to the UE, an indication to request the on-demand system information block of the first neighbor cell, wherein the report includes information from the on-demand system information block of the first neighbor cell.

21. The serving cell of claim 14, wherein the one or more processors are individually or collectively further operable to execute the code to cause the serving cell to:
 receive a capability indication that the UE is capable of transmitting a demand signal to neighboring cells for reports, and wherein the report is provided responsive to transmission of the demand signal to the first neighbor cell.

22. The serving cell of claim 14, wherein, to transmit the request for the report, the one or more processors are individually or collectively operable to execute the code to cause the serving cell to:
 transmit a request for a system frame number and frame timing difference (SFTD) measurement report, and wherein the first signal is a synchronization signal block (SSB) that includes a SSB index or a half-frame index, and the report indicates a timing difference between the SSB of the first neighbor cell and a frame boundary of the serving cell.

23. The serving cell of claim 14, wherein the report indicates one or more measured metrics of a synchronization signal block (SSB) transmitted by the first neighbor cell, wherein the SSB is a reduced-content SSB that does not include a beam index associated with a beam that is used to transmit the SSB.

24. A method for wireless communication at a user equipment (UE), comprising:
   receiving, from a serving cell, a request for a report for one or more neighbor cells;
   receiving an indication from a first neighbor cell of the one or more neighbor cells that a first signal that provides information for the report from the first neighbor cell is an on-demand signal; and
   transmitting a notification to the serving cell that indicates the first signal of the first neighbor cell is an on-demand signal.

25. The method of claim 24, further comprising:
   transmitting, responsive to the indication that the first signal is an on-demand signal, a transmission request to the first neighbor cell to transmit the first signal;
   obtaining information for the report from a transmission of the first signal from the first neighbor cell; and
   transmitting the information for the first neighbor cell to the serving cell in the report.

26. The method of claim 24, further comprising:
   determining that one or more conditions associated with the first neighbor cell meet a threshold value; and
   transmitting a transmission request to the first neighbor cell to transmit the first signal.

27. The method of claim 24, further comprising:
   transmitting a capability indication that the UE is capable of transmitting a demand signal to neighboring cells for reports.

28. A method for wireless communication at a serving cell, comprising:
   transmitting, to a user equipment (UE), a request for a report for one or more neighbor cells;
   receiving, from the UE, an indication that a first signal of a first neighbor cell that provides information for the report is an on-demand signal; and
   receiving, from the UE, the report that includes information for the first neighbor cell.

29. The method of claim 28, further comprising:
   configuring the UE to transmit, responsive to the indication that the first signal is an on-demand signal, a transmission request to the first neighbor cell to transmit the on-demand signal.

30. The method of claim 29, wherein the configuring the UE comprises:
   providing one or more threshold values associated with the first neighbor cell, wherein the transmission request to the first neighbor cell is transmitted responsive to one or more conditions of the first neighbor cell meeting the one or more threshold values.

* * * * *